United States Patent [19]

Shiraishi et al.

[11] Patent Number: 5,448,690
[45] Date of Patent: Sep. 5, 1995

[54] IMAGE PROCESSING SYSTEM ENABLING REAL-TIME OUTPUT OF IMAGE SIGNAL BASED ON POLYGON IMAGE INFORMATION

[75] Inventors: Naoto Shiraishi, Toyonaka; Tatsuya Fujii, Nishinomiya; Masanobu Fukushima; Tatsuya Nakajima, both of Toyonaka; Yasuhiro Izawa, Suita, all of Japan

[73] Assignee: Ricoh Company, Ltd., Tokyo, Japan

[21] Appl. No.: 197,976

[22] Filed: Feb. 17, 1994

[30] Foreign Application Priority Data

Feb. 19, 1993 [JP] Japan .................................. 5-055020

[51] Int. Cl.$^6$ .............................................. G06T 1/00
[52] U.S. Cl. ...................................... 395/133; 395/134; 395/143
[58] Field of Search .............................. 395/119–121, 395/126–128, 133, 134, 141, 143, 155, 160, 161

[56] References Cited

U.S. PATENT DOCUMENTS

| 5,058,042 | 10/1991 | Hanna et al. | 395/160 X |
|---|---|---|---|
| 5,249,265 | 9/1993 | Liang | 395/160 |
| 5,295,243 | 3/1994 | Robertson et al. | 395/160 |

FOREIGN PATENT DOCUMENTS 231379  7/1987  Japan .......................... G06F 15/62

*Primary Examiner*—Almis R. Jankus
*Attorney, Agent, or Firm*—Popham, Haik, Schnobrich & Kaufman, Ltd.

[57] ABSTRACT

A polygon extracting unit divides a screen image into n-level hierarchy in a scan-line shifting direction. The polygon extracting unit then accesses the sort memory and then reads data, from the screen memory, concerning the end points of the polygon corresponding to the value obtained as a result of the sort memory access. Then, the same unit, in the highest-level regions of the hierarchy, extracts the polygon edge-pairs overlapping the highest-level region. Then, the same unit, based on polygon edge-information, calculates the information concerning the corresponding edge pair to appear on the scan line. A polygon-edge-pair memory stores data concerning the starting point and ending point of the polygon on the scan line. A transfer unit determines whether or not the extracted polygon edge-pair overlaps with the relevant region. The same unit then transfers the polygon edge-pair to the lower-level regions if the polygon edge-pair overlaps. A polygon-edge-pair data transfer unit, in the lowest-level region, determines whether or not the polygon edge-pair overlaps with the lowest-level region. The same unit then transfers a parameter required for vertical interpolation from the polygon-edge-pair memory, for the polygon edge-pair, if the polygon edge-pair overlaps. A vertical-interpolation operation unit calculates the gradient of the relevant polygon edge-pair based on the relevant data. The same unit then calculates so as to interpolate between the right crossing point and the left crossing point on the scan line. An output unit outputs dot data synchronized to the scan line associated with display unit for displaying the relevant polygon figure.

7 Claims, 25 Drawing Sheets

SCAN-LINE OPERATION

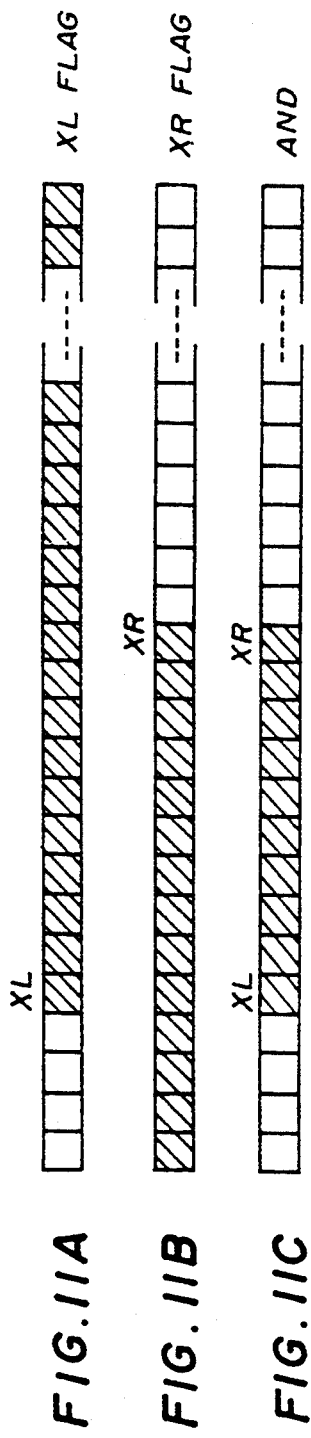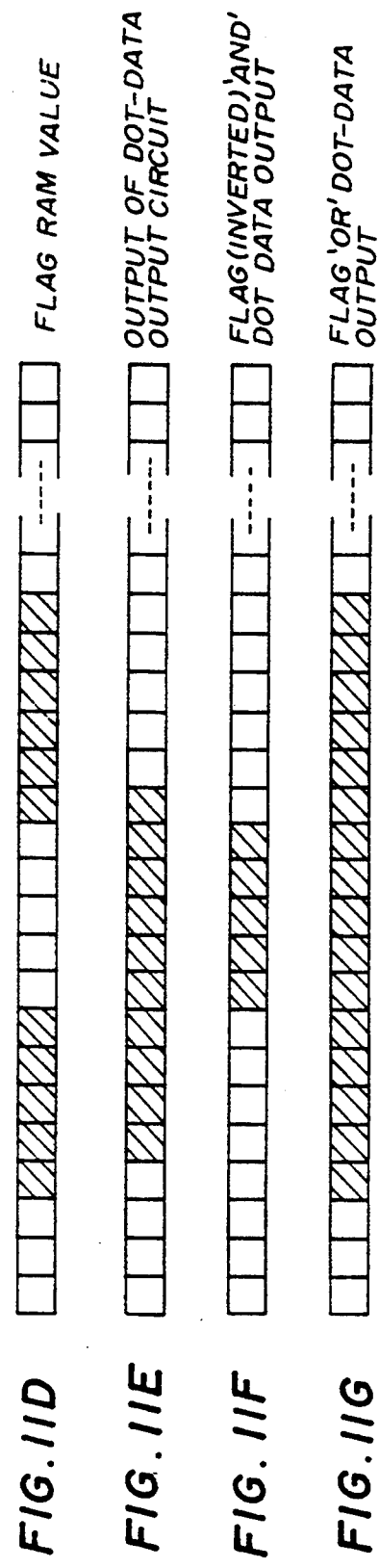

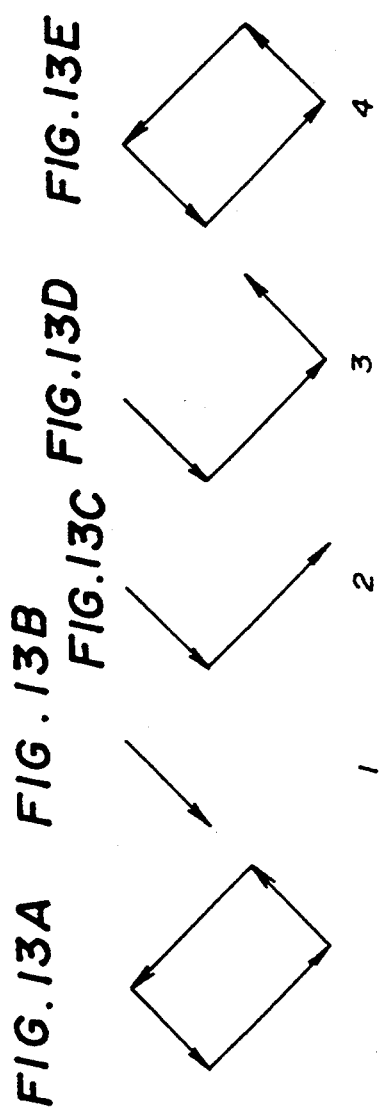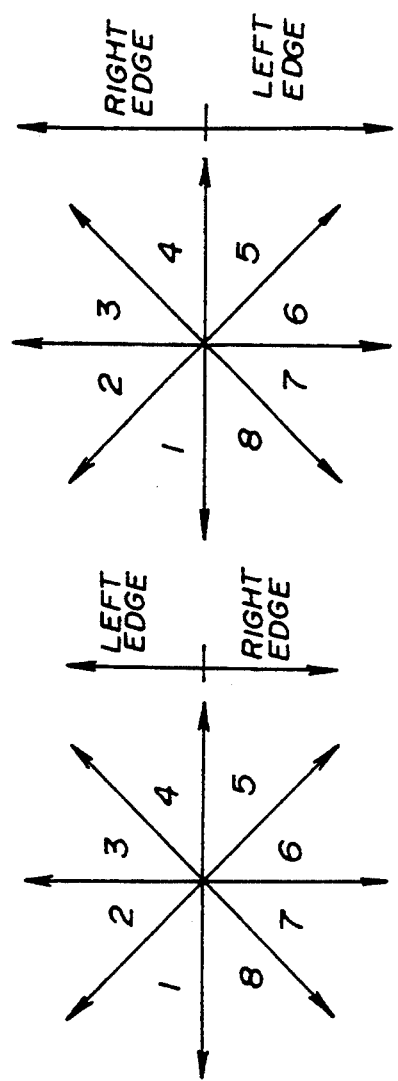

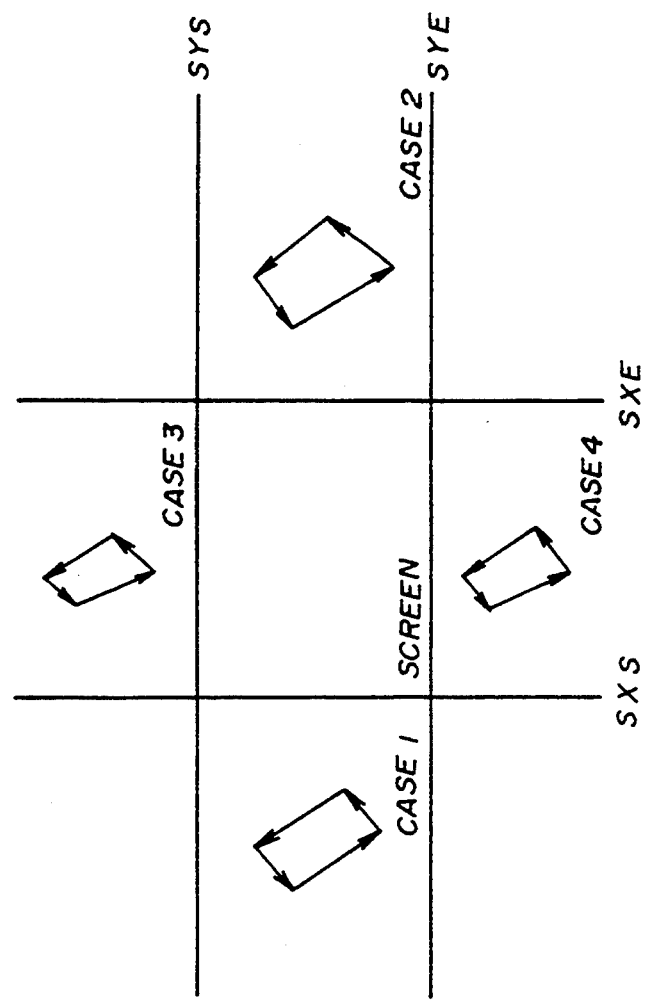

| | LEFT-EDGE COUNTER | RIGHT-EDGE COUNTER | | EDGE PAIR |
|---|---|---|---|---|
| FIG.17A | 1 | 1 | 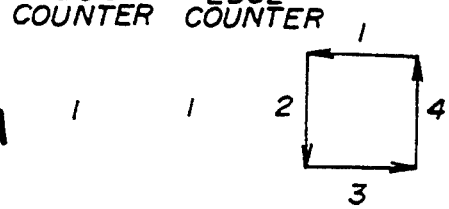 | L R<br>2-4 |
| FIG.17B | 1 | 2 | 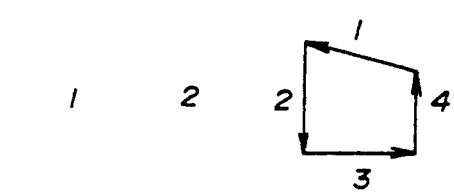 | L R<br>2-1<br>2-4 |
| FIG.17C | 2 | 1 | 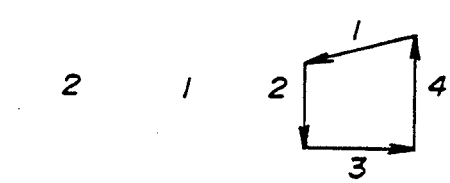 | L R<br>1-4<br>2-4 |
| FIG.17D | 1 | 3 | 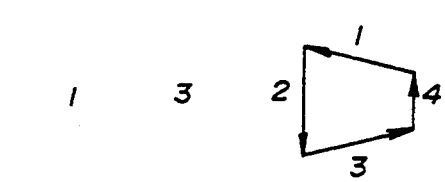 | L R<br>2-1<br>2-4<br>2-3 |
| FIG.17E | 3 | 1 | 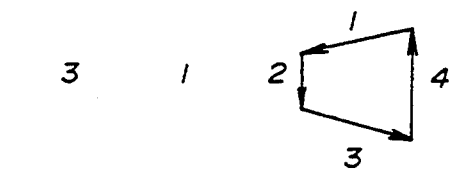 | L R<br>1-4<br>2-4<br>3-4 |
| FIG.17F | 2 | 2 |  | L R<br>1-4<br>2-3 |
| FIG.17G | 2 | 2 | 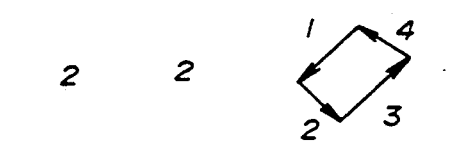 | L R<br>1-4<br>1-3<br>2-3 |
| FIG.17H | 2 | 2 | 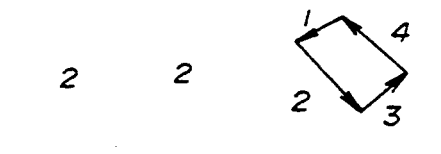 | L R<br>1-4<br>2-4<br>2-3 |

FIG.18A  FIG.18B

Y STARTING POINT

Y ENDING POINT

FIG.19A
POLYGON EDGE-PAIR MEMORY FORMAT

| ADDRESS | LEFT EDGE | | | | RIGHT EDGE | | | | EDGE PAIR | |
|---|---|---|---|---|---|---|---|---|---|---|
| | X STARTING POINT | Y STARTING POINT | GRADIENT | ATTRIBUTE | X STARTING POINT | Y STARTING POINT | GRADIENT | ATTRIBUTE | Y STARTING POINT | Y ENDING POINT |
| 1 | | | | | | | | | | |
| 2 | | | | | | | | | | |
| ⋮ | | | | | | | | | | |

FIG.19B  AD2 MEMORY FORMAT

| ADDRESS | EDGE PAIR | |
|---|---|---|
| | Y STARTING POINT | Y ENDING POINT |
| 1 | | |
| 2 | | |
| 3 | | |
| 4 | | |
| ⋮ | | |

FIG.19C  AD MEMORY FORMAT

| ADDRESS | POLYGON EDGE-PAIR MEMORY ADDRESS |
|---|---|
| 1 | |
| 2 | |
| ⋮ | |

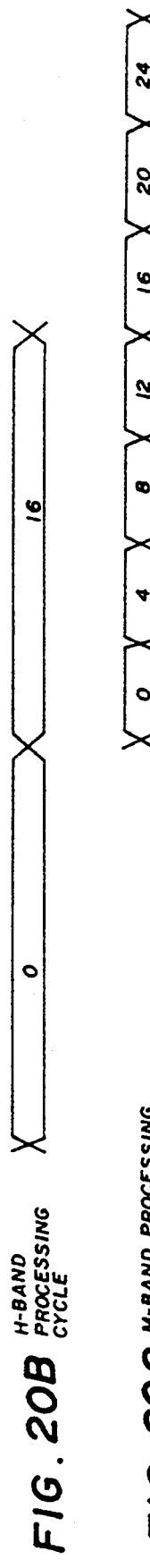
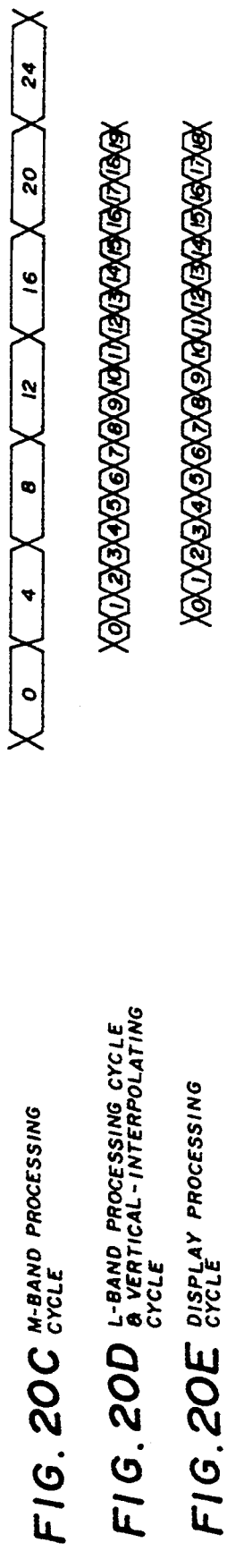
FIG. 20A LINE PROCESSING CYCLE
FIG. 20B H-BAND PROCESSING CYCLE
FIG. 20C M-BAND PROCESSING CYCLE
FIG. 20D L-BAND PROCESSING CYCLE & VERTICAL-INTERPOLATING CYCLE
FIG. 20E DISPLAY PROCESSING CYCLE

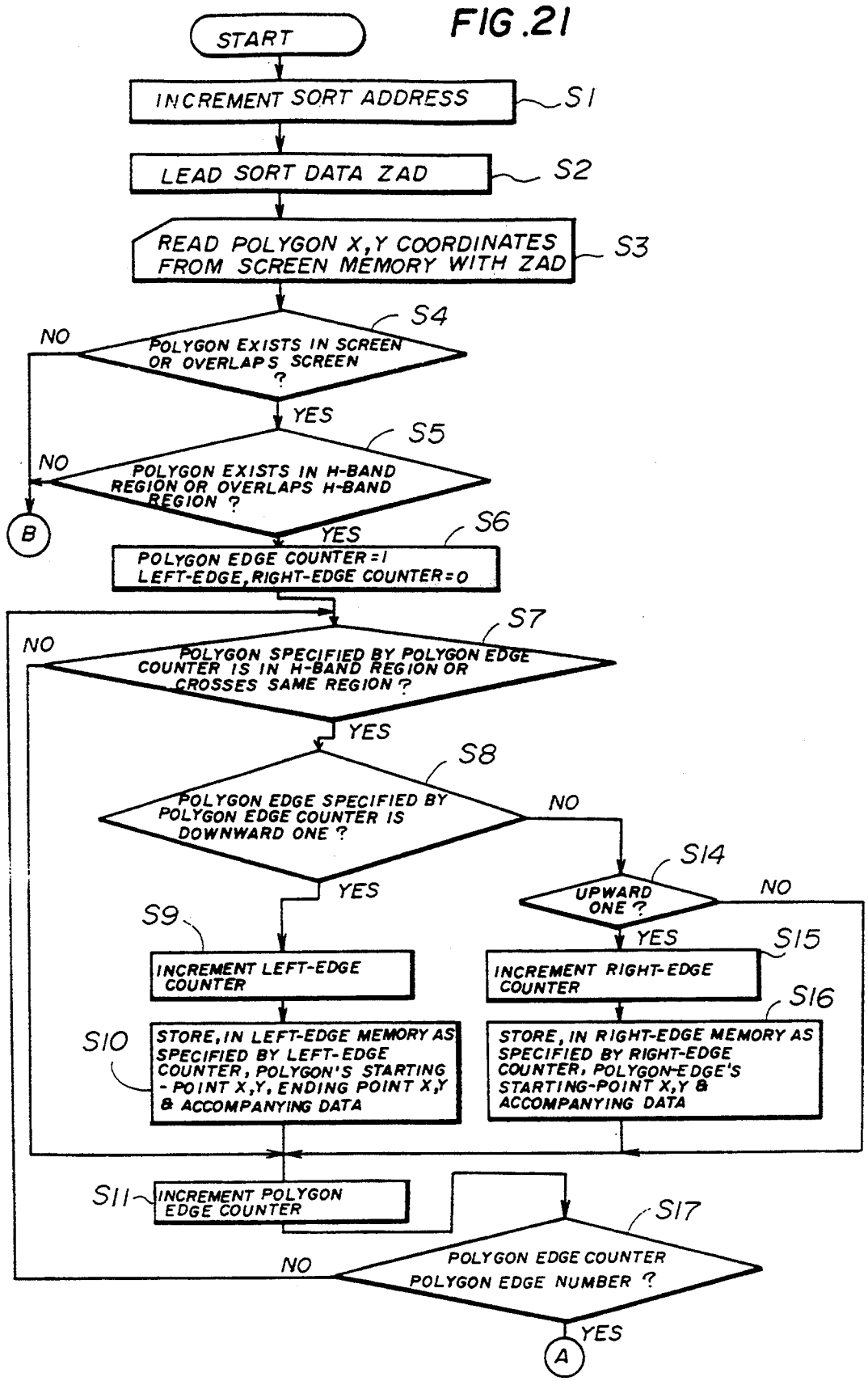

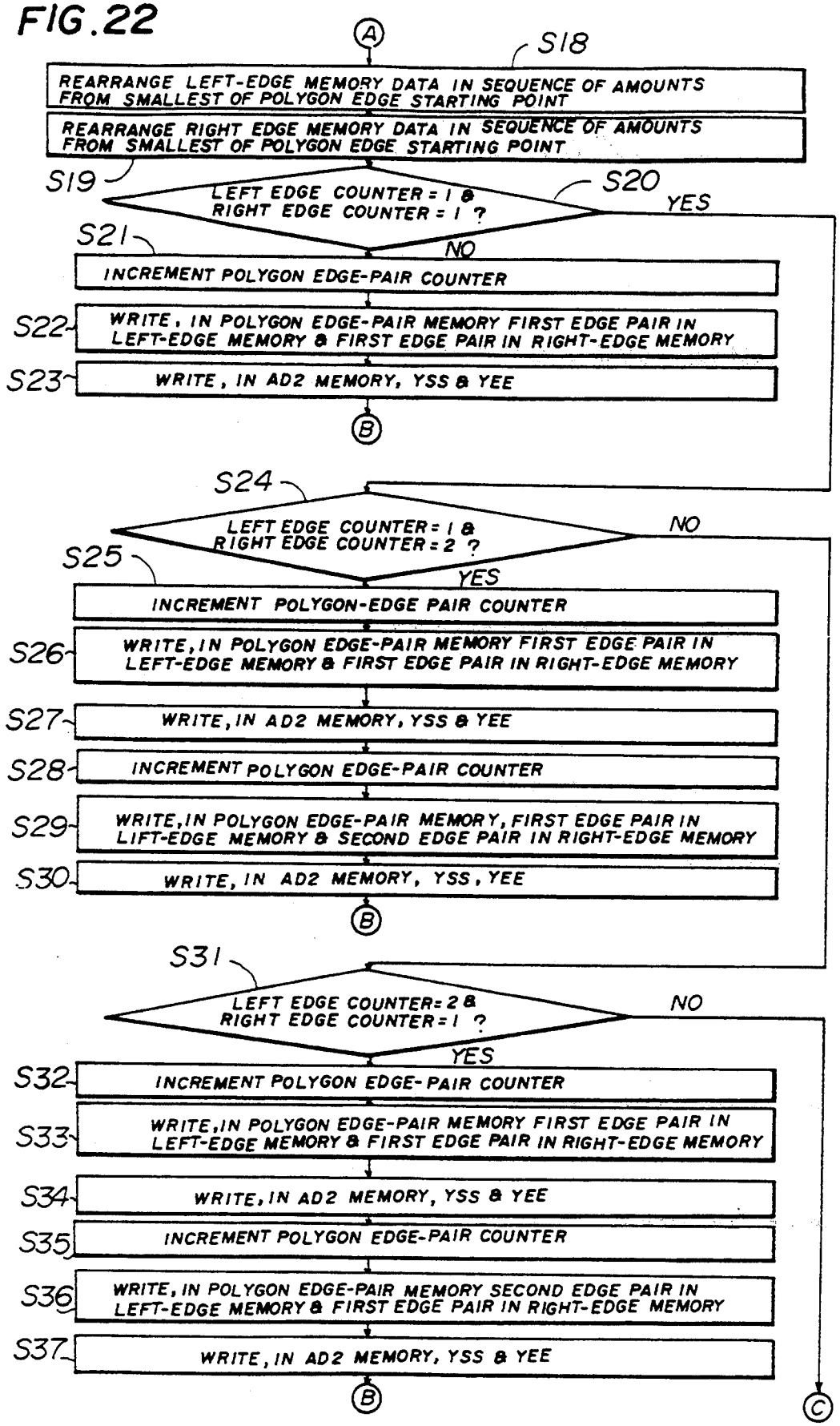

IMAGE PROCESSING SYSTEM ENABLING REAL-TIME OUTPUT OF IMAGE SIGNAL BASED ON POLYGON IMAGE INFORMATION

BACKGROUND OF THE INVENTION

1. Field of the Invention

The present invention relates to an image processing system, and in particular relates to an image processing system applicable to three-dimensional computer graphics in a workstation, game equipment and so forth which can in real time output an image signal based on image information concerning polygons.

2. Related Art

An image processing system in the related art is one which outputs various kinds of image signals after composing them for displaying on a CRT, based on image information supplied from outside the image processing system.

Such a system may output not only a two-dimensional plane image but also a stereoscopic two-dimensional image, that is, a simulated three-dimensional image. Thus, such a system may be widely used for a game equipment for three-dimensional images, computer graphics, and so on, for example.

A bit-mapped display (graphic display) method may be used for such a kind of image processing system. There, a bit-mapped memory is provided having storing areas respectively corresponding to all pixels, one by one, constituting a relevant CRT screen image. All pixel information needed to display one image on the CRT screen is stored in each storing area of this memory. In one example of such a kind of image processing in computer graphics, in a case where an arbitrary figure composed of polygons is to be displayed, the following procedures are repeatedly executed: A contour of a polygon is drawn on the screen, and then the interior thereof is painted with a specified color stored in the memory. Therefore, a large number of polygons requires a large-capacity memory and may not allow real-time processing.

Japanese Laid-Open Patent Application No. 62-231379 (international patent classification: G06F 15/62) discloses an image composing apparatus. This apparatus can in real time output an image signal based on information concerning a contour of a specified figure. This apparatus comprises contour-point information storing means for storing contour lines associated with a figure to be displayed on a CRT in a horizontal-scan line storing area provided corresponding to each horizontal scan line. There, the contour lines to be thus stored are successively written in the area according to their priority levels. The apparatus further comprises an index memory. An accompanying data packet included in each contour information packet from the horizontal-scan storing area corresponding to the relevant vertical scanning position is then read. The above index memory is used for storing the thus read accompanying data packets at the index-memory addresses corresponding to their priority levels. The above reading and storing operation is executed in synchronization with the horizontal scanning signal. The apparatus further comprises an address generating means. In synchronization with the horizontal scanning signal, the address generating means successively reads a contour-point pair included in each contour information packet from the horizontal-scan storing area corresponding to the relevant vertical scanning position. Then, the address generating means, when the horizontal scan is being performed in a region specified by each contour-point pair, outputs, to the index memory, the reading address concerning the corresponding accompanying data based on its priority level. Thus, the apparatus in real time outputs the image signal for the display on the CRT based on the contour-point information concerning the specified figure.

The above-described image composing apparatus comprises a field processor for successively processing the polygons in a digital differentiation analysis (DDA). The apparatus stores the result of the above operation into a frame memory. It is necessary to store, in this frame memory, accompanying information for indicating X-starting points and X-ending points associated with the polygons on one scan line, and their attributes, after all polygons are processed. Therefore, a large-capacity memory is required for the frame memory, which has a high cost. In particular, an increase in the amount of the accompanying information concerning the polygons results in a sharp increase in the required memory capacity. Thus the memory portion occupied in the apparatus becomes extremely large.

SUMMARY OF THE INVENTION

An object of the present invention is to provide an image processing system which eliminates the above problems arising in the system according to the related art, enabling reduction in the required memory capacity and also enabling speedy image processing.

In order to achieve the above object of the present invention, an image processing system according to the present invention is based on a polygon scan algorithm, in which the relevant processing is performed only for convex polygons and the relevant image is divided into n pieces of hierarchical regions. Then, polygon edge-pairs, which overlaps the highest-level region among the hierarchical regions are extracted. Then, from among the thus extracted polygon edge-pairs, those which overlaps with the middle-level region are extracted. Then polygon edge-pairs which overlap with the lowest-level region among the hierarchical regions, are extracted. The remaining polygon edge-pairs are used so that necessary parameters are then provided for vertical-interpolating operation on the remaining polygon edge-pairs. Thus, the number of polygon edge-pairs to be displayed in the hierarchical regions may be reduced. Then, a pipeline operation is performed for each hierarchical region. As a result, it is possible to eliminate the frame memory required in the system according to the related art and also to process a large number of polygons on one line.

Further, an image processing system in another aspect of the present invention comprises:
  a screen memory for storing X and Y end point information constituting polygons;
  a sort memory for storing polygon numbers sorted in accordance with the priority of the polygons;
  a polygon extracting means for dividing a screen image into n-level hierarchy in a scan-line shifting direction; said polygon extracting means then accessing said sort memory; reading data from said screen memory concerning the end point of the polygon corresponding to the value obtained as a result of the sort memory access; in the highest-level region of the hierarchy, extracting a polygon edge-pair overlapping with said highest-level region; and then, based on polygon edge information, calculating the information concerning the corresponding edge pair to appear on the scan line;

a polygon-edge-pair memory for storing data concerning the starting point and ending point of a polygon on the scan line;

transfer means for determining whether or not the extracted polygon edge-pair overlaps with the relevant region, said transfer means then transferring said polygon edge-pair to the lower-level region if said polygon edge-pair overlaps;

polygon-edge-pair data transfer means for, in the lowest-level region, determining whether or not said polygon edge-pair overlaps with said lowest hierarchical region, said means then transferring a parameter required for vertical interpolating from said polygon-edge-pair memory, for said polygon edge-pair, if said polygon edge-pair overlaps;

vertical-interpolating operation means for calculating the gradient of the relevant polygon edge-pair based on the relevant data; said means then calculating so as to interpolate between the right crossing point and the left crossing point on the scan line;

output means for outputting dot data in synchronization with the scan line associated with display means for displaying the relevant polygon figure.

Further, the following construction is preferable:

said polygon-edge extracting means comprises:

means for obtaining the direction of the line vector forming each edge constituting the polygon based on the X and Y end point information and polygon-edge information;

means for separating, in accordance with the obtained directions of the line vectors, the respective edges into two groups comprising a right edge group and a left edge group;

a left edge counter to be incremented each time one of the separated edges is found to belong to said left edge group;

a left edge memory for storing the edge information concerning the left edges;

a right edge counter to be incremented each time one of the separated edges is found to belong to said right edge group;

a right edge memory for storing the edge information concerning the right edges; and means for sorting the edges stored in said left edge memory and right edge memory according to scan line, said means calculating the information concerning the edge pairs corresponding to the relevant polygon based on the counted values of the left edge counter and right edge counter.

Further, the following elements are also preferable to add to the above construction:

visible/invisible determination processing means for determining based on the right crossing point and left crossing point calculated by said vertical interpolating means whether the relevant polygon comprises a polygon to be displayed or a polygon not to be displayed; and a line memory for storing the right crossing point and left crossing point on the scan line, said memory storing only the right crossing point and left crossing point of a polygon to be displayed.

The provision of the above visible/invisible determination processing means enables the system to store only data concerning polygons to be displayed in the line memory. Thus, it is possible to effectively display all polygons to be processed during one scan-line display cycle.

Other objects and further features of the present invention will become more apparent from the following detailed description when read in conjunction with the accompanying drawings.

BRIEF DESCRIPTION OF THE DRAWINGS

FIGS. 11A, 11B, 11C, 11D, 11E, 11F, and 11G illustrate a dot output operation in the visible/invisible determination processing unit of the present invention, FIGS. 11A, 11B and 11C showing a diagram of an output of the dot-data output circuit and FIGS. 11D, 11E, 11F, and 11G showing a diagram illustrating an operation of a flag RAM;

FIGS. 13A, 13B, 13C, 13D and 13E show diagrams illustrating polygon display examples;

FIGS. 14A and 14B show diagrams illustrating a region of a line vector;

FIG. 16 shows a diagram illustrating a relationship between a screen and clipping;

FIGS. 17A, 17B, 17C, 17D, 17E, 17F, 17G, and 17H show a relationship between counter values of a left edge counter and right edge counter, and edge pairs to be calculated;

FIGS. 18A and 18B show diagrams illustrating kinds of polygon edge-pairs;

FIGS. 19A, 19B and 19C show diagrams illustrating formats of memories used in the embodiment of the present invention, FIG. 19A showing one of a polygon edge-pair memory, FIG. 19B showing one of an AD2 memory, and FIG. 19C showing one of an AD memory;

FIGS. 20A, 20B, 20C, 20D, and 20E show examples of processing timings of respective operations in the present invention;

FIGS. 21, 22, 23, 24 and 25 show operation flow charts illustrating an H-band region processing operation in the drawing processing unit in the embodiment of the present invention;

DESCRIPTION OF THE PREFERRED EMBODIMENTS

An embodiment of the present invention will be described.

First, the general construction of a simulated-three-dimensional image processing system using the present invention will be described.

Figure 1:
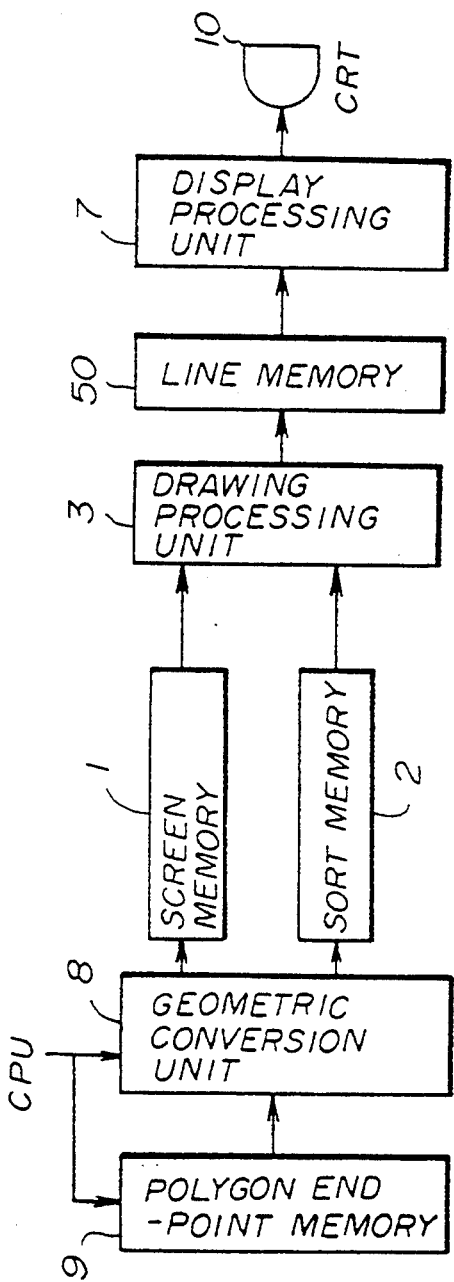
FIG. 1 shows a block diagram of a general construction of an simulated-three-dimensional image processing system using the present invention.

The simulated-three-dimensional image processing system shown in FIG. 1 is an example suitable for use in game equipment such as a racing game or an airplane piloting simulation game. A general construction of the embodiment of the present invention will be described with reference to FIG. 1.

In the embodiment, a CPU provides simulation images in various conditions comprising information concerning a plurality of polygons into a polygon end-point memory 9. Each polygon is represented by, as shown in FIGS. 13A–13E, combining respective information packets concerning vectors starting from respective end points. Any kind of object may be represented as a set of polygons. The CPU reads data from a world memory (not shown in the drawing) containing data such as end-point information indicating the respective end points of the above polygons. In the world memory end-point information and color information associated with a mapping memory and so forth is also stored. In the above mapping memory, patterns are drawn on the respective polygons. The CPU obtains input data from an operator unit such as a control handle. The operator unit converts the electrical signals related to the operator's actions into input data for the CPU. Then, the CPU provides the resulting data to a geometric conversion unit 8.

The geometric conversion unit 8, in accordance with a command provided by the CPU, with reference to various kinds of polygon data stored in the world memory, reads data from the polygon end-point memory 9. Then, the unit 8 geometrically converts end-point coordinates of the respective polygons to two-dimensional form using a visual-field conversion and a perspective projection conversion. Then, the unit 8 stores the resulting two-dimensional X and Y coordinates in a screen memory 1. Further, the geometric conversion unit 8 determines a representation value resulting from a polygon-center visual-field conversion, that is, a representation value (Z-value) of the distances concerning the relevant polygon from the relevant view point. Then, the unit 8 sorts the polygons according to priority where the polygon having the smallest representation value is given the highest priority. Then, as a result of the sorting, the unit 8 outputs the polygon addresses (numbers) into a sort memory 2.

The screen memory 1 stores end-point information concerning each polygon which has been processed by means of the geometric conversion unit 8 and two-dimensionalized. In this screen memory 1, attribute data, such as R, G, and B color information, corresponding to the respective end points of the polygons is also stored.

Polygon addresses are stored in the sort memory 2 in order of increasing polygon 2-value due to the sorting in accordance with the priority levels (Z-values) performed in the polygon-center visual-field conversion. Based on the priority-level-sorted sequence of polygon addresses stored in the sort memory 2, a drawing processing unit 3 reads the relevant polygon end-point information from the screen memory 1 for the polygons included in a processing region obtained as a result of dividing the screen image in the Y-direction into horizontal strips regions. Then, the unit 3 calculates the X-starting points and X-ending points of the relevant polygons overlapping with the scan line which the display unit requires. The detail of the drawing processing unit 3 will be described presently.

A line memory 50 is used to store therein X addresses, that is, the X-starting point and X-ending point and attribute data of the left edge and right edge of each polygon to be displayed by means of the above drawing processing unit 3.

Data provided by the line memory 50 is transferred to a display processing unit 7. Then, the display processing unit 7, in synchronization with the line scanning of the CRT 10, outputs the relevant polygons as comprising dot data.

Figure 2:
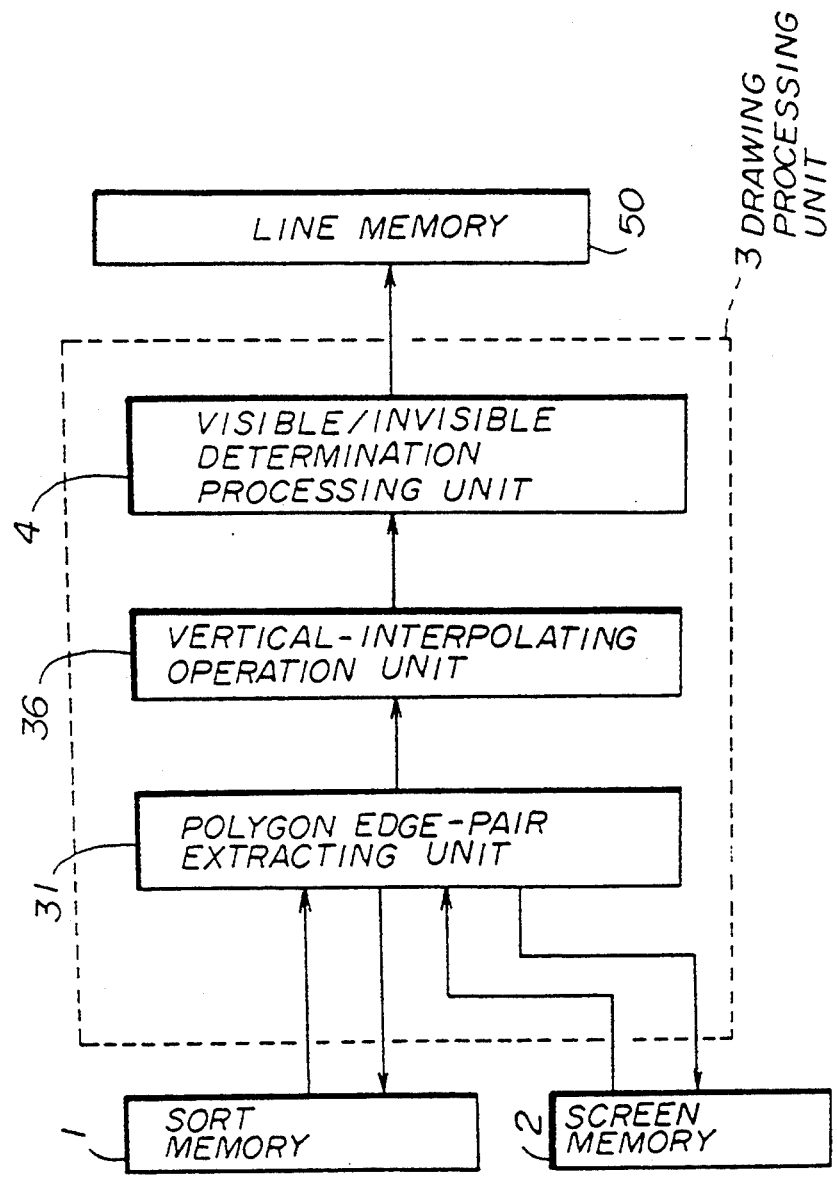
FIG. 2 shows a block diagram illustrating a construction of a drawing processing unit acting as an essential element of the present invention.

Next, the drawing processing unit 3 will be described with reference to FIG. 2.

Data is provided to a polygon edge-pair extracting unit 31 from the screen memory 1 and sort memory 2. The polygon edge-pair extracting unit 31 successively accesses the sort memory 2 and then reads corresponding data concerning the polygon end-points from the screen memory 1 using the values obtained from the above sort memory access. Then, the polygon edge-pair extracting unit 31 in the present invention divides, in the scan-line shifting direction, the screen image into horizontal strip regions in a manner so as to finally forming n-level hierarchy as presently described with reference to FIG. 12. Then, the unit 31, in the highest-level region, extracts the polygon edge-pairs overlapping with the region. The unit 31, for the thus extracted polygon edge-pairs determines whether or not the same polygon edge-pairs overlap with the middle-level region. Thereafter, the unit 31 provides the information concerning the thus determined overlapping polygon edge-pairs to the lower-level region, and determines whether or not the transferred polygon edge-pairs overlap with that region. Then, the unit 31, for the thus determined overlapping polygon edge-pairs, transfers parameters necessary for the vertical-interpolating operation. Further, this polygon edge-pair extracting unit 31 performs simple clipping processing on polygons which extend beyond the screen boundary and selects proper polygon end-point information for each edge.

Then, the unit 31 transfers the polygon's end-point information for each edge to a vertical-interpolating operation unit 36. The unit 36 then obtains, by calculation, edge pairs to initially become pairs on the scan line.

The vertical-interpolating operation unit 36, using data provided by the polygon edge-pair extracting unit 31, obtains a polygon X left crossing point (XL) and X right crossing point (XR) on the scan line located between two edges, based on the below described operation equations. Then, the unit 36 transfers the thus obtained data to a visible/invisible determination unit 4. The unit 36 transfers only visible polygon data to the line memory 50.

(For better understanding of the reason for the provision of such a visible/invisible determination unit, the following publication may be helpful: I. E. Sutherland, Ten unsolved problems in computer graphics, Datamation, 12(5):22, 1996. The key word may be hidden surface removal.)

These respective units are controlled by controllers. The controllers control their operations based on operation flow charts shown in FIGS. 21–28.

Figure 3:
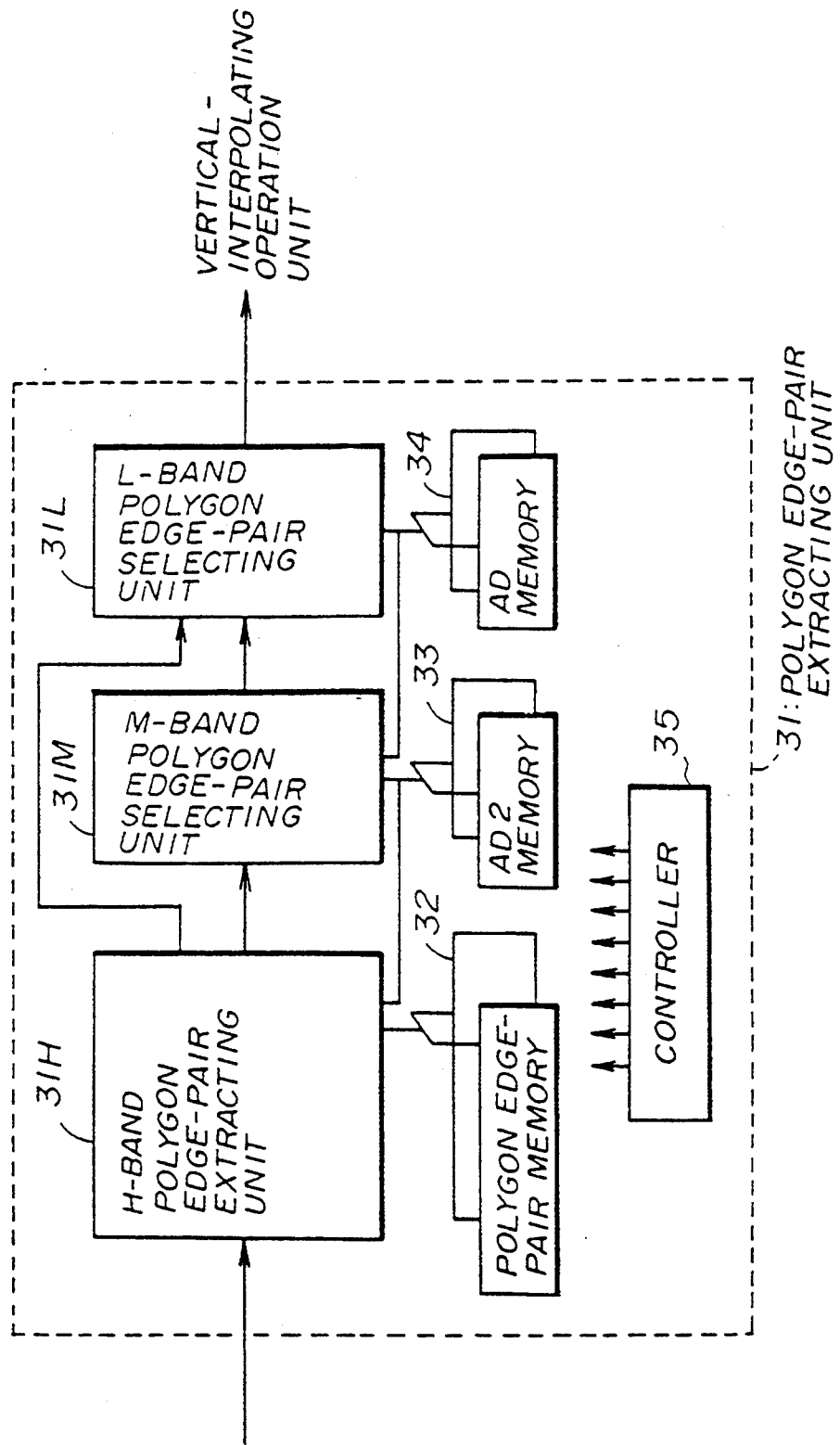
FIG. 3 shows a block diagram illustrating a construction of a polygon-edge-pair extracting unit acting as an essential element of the present invention.

A concrete construction example of the above polygon edge-pair extracting unit 31 will be described with reference to FIG. 3.

Figure 12:
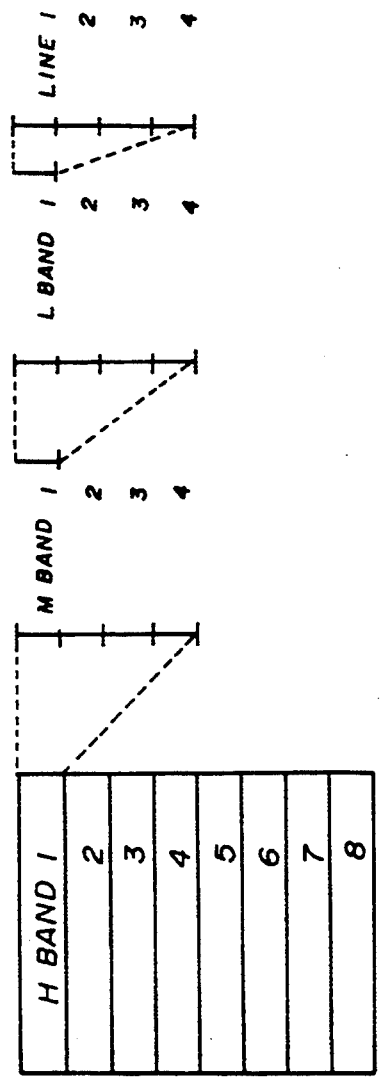
FIG. 12 shows a diagram illustrating a region division example in the Y-direction according to the present invention.

The polygon edge-pair extracting unit 31 in the present invention divides the screen image into the multiple-level hierarchy regions. Then, the unit 31 extracts the polygon edge-pairs overlapping with the higher-level region. That is, as shown in FIG. 12, in this embodiment, the screen is divided into H-band regions. Each of the H-band regions is divided into M-band regions. Each of the M-band regions is divided into L-band regions. In this way, the number of polygon edge-pairs to be displayed in the region is limited. By means of a pipeline operation for each region, without using any frame memory, it is possible to process a large number of polygons on one line.

As shown in FIG. 12, in this embodiment, the screen is divided into 8 H-band regions. Each H-band region further subdivided into 4 M-band regions. Further, each M-band region subdivided into 4 L-band regions and then each L-band region is subdivided into 4 lines.

Data provided by the screen memory 1 is provided to an H-band polygon edge-pair extracting unit 31H. The H-band polygon edge-pair extracting unit 31H obtains, by calculation, the polygon edge-pairs for all polygons included in or overlapping with each of the relevant H-band regions, which is each of the highest-level band regions in the hierarchy obtained in the above-described region division operation for the screen shown in FIG. 12. The thus obtained polygon edge-pairs are then stored in a polygon edge-pair memory 32 in the format as shown in FIG. 19A. The same polygon edge-pairs are also stored in a second address (AD2) memory 33 in the format as shown in FIG. 19A.

Subsequently, data provided from the screen memory 1 is provided to an M-band polygon edge-pair selecting unit 31M. The M-band polygon edge-pair selecting unit 31M selects, from data stored in the AD2 memory 33, the polygon edge-pairs for all polygon edges included in or overlapping with each of the relevant M-band regions, that is, each of the second-level band regions in the hierarchy obtained in the above-described region division operation for the screen shown in FIG. 12. The thus selected polygon edge-pairs are then stored in an address (AD) memory 34. The data in the AD memory 34 has the format as shown in FIG. 19C and consists of the addresses, associated with the AD2 memory 33, of the polygon edge-pairs overlapping with the relevant M-band region.

It is possible to provide a plurality of pipeline stages constituting of such M-band polygon edge-pair selecting units. As a result, an increased number of polygons may be processed thereby.

Next, an L-band polygon edge-pair selecting unit 31L selects, from the data stored in the AD memory 34, all polygons overlapping with each of the relevant L-band regions, that is, each of the last-level band regions in the hierarchy obtained in the above-described screen division operation shown in FIG. 12. Then, the unit 31L reads the parameters corresponding to the thus selected polygon edge-pairs from the polygon edge-pair memory 32 and transfers them to the vertical-interpolating operation unit 36.

The above edge-pair selection units are controlled by a controller 35. The controller 35 controls the respective units in accordance with the operation flow charts shown in FIGS. 21–26.

Figure 4:
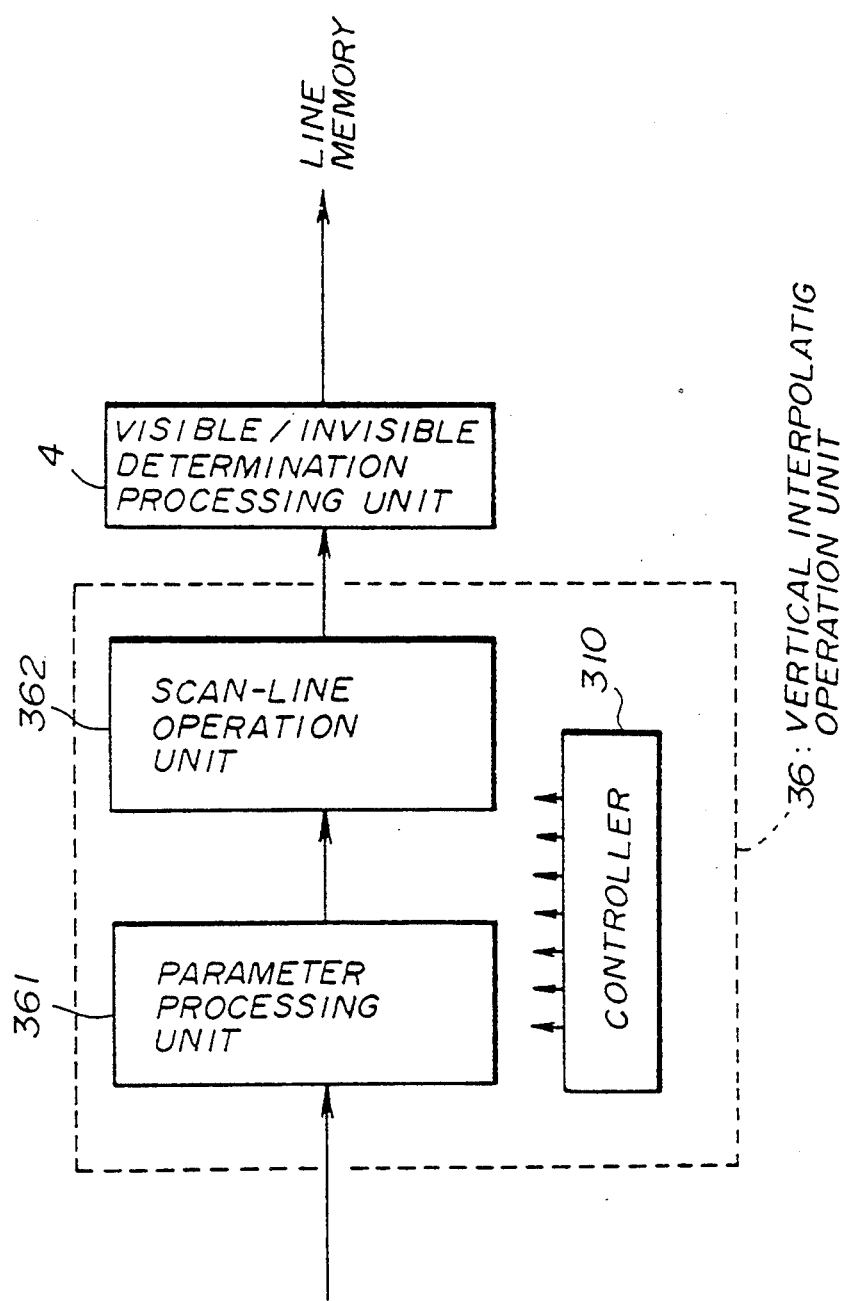
FIG. 4 shows a block diagram illustrating a construction of a vertical interpolating operation unit acting as an essential element of the present invention.

Next, the vertical-interpolating operation unit 36 will be described with reference to FIG. 4.

The polygons' end-point information, divided into information concerning the left edges and information concerning right edges, is transferred to a parameter processing unit 361 of the vertical-interpolating operation unit 36. The parameter processing unit 361 obtains the gradients (DDXL, DDXR) of the respective polygon edges by calculation using starting-point and ending-point addresses (XLS, XLE) (XRS, XRE) of the respective polygon edges. Then, the unit 361 outputs, to a scan-line operation unit 361, data concerning the thus obtained gradients of the respective polygon edges, the X starting-point, Y starting-point and Y ending-point of the left edges and right edges of the respective polygons, and the relevant attributes. Further, the gradients (DDXL, DDXR) of the respective polygons are stored in the polygon edge-pair memory 32.

Figure 15A:
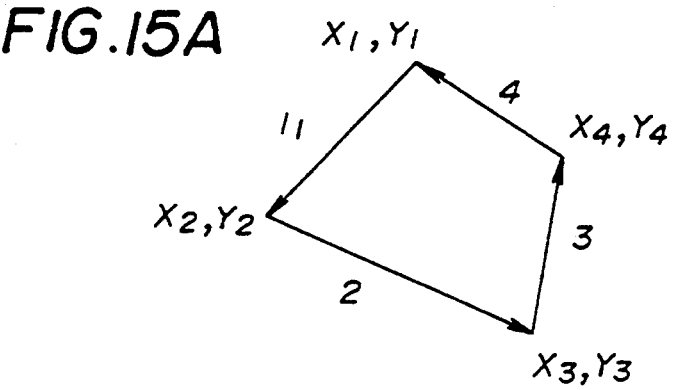
FIGS. 15A, 15B, 15C and 15D show diagrams illustrating a relationship between polygon edge-pairs.
Figure 15B:
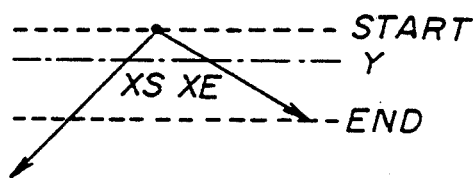
Figure 15C:
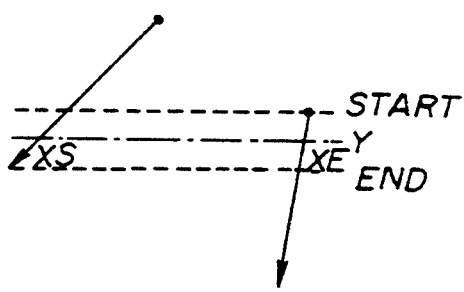
Figure 15D:
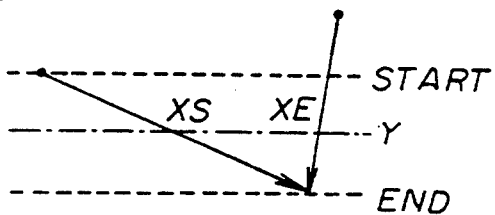
Figure 23:
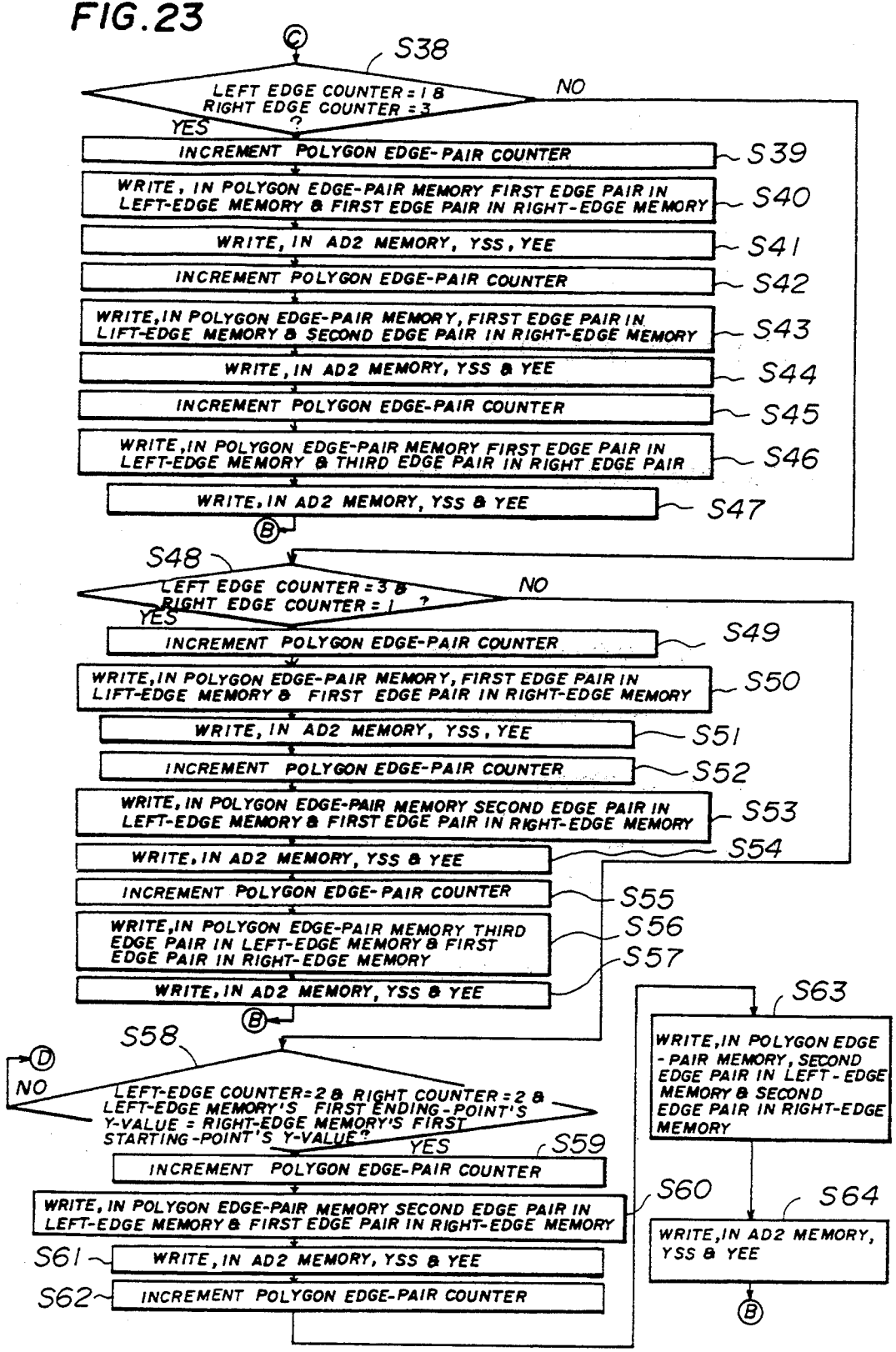
Figure 24:
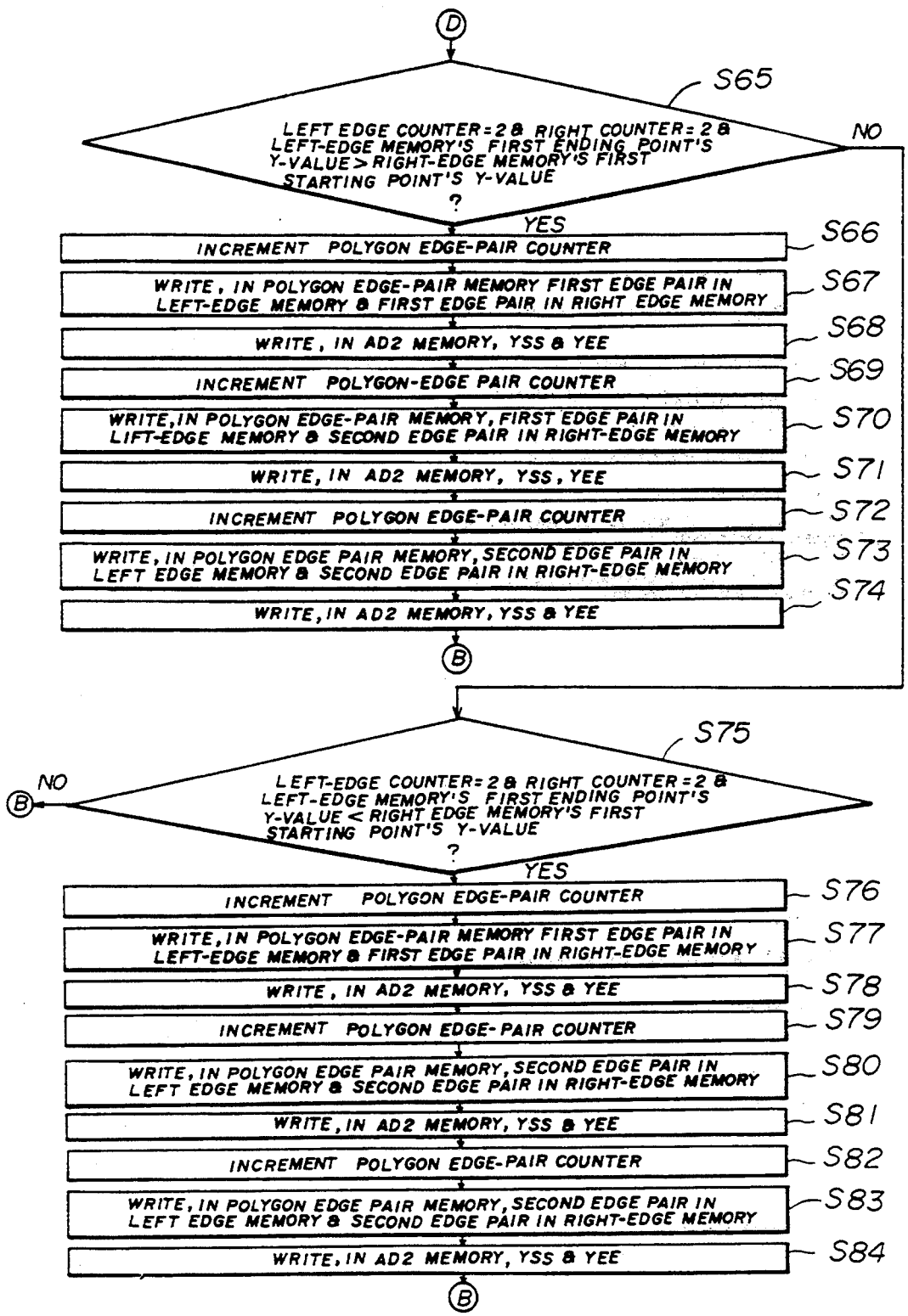

The parameter processing unit 361 calculates the respective parameters for polygon edge-pairs in states as shown in respective FIGS. 15B, 15C and 15D of the polygon shown in FIG. 15A, for example. This calculation comprises the following equations:

In case of FIG. 15B, $$DDXL = \frac{X2 - X1}{Y2 - Y1},\qquad(1)$$

$$DDXR = \frac{X4 - X1}{Y4 - Y1};\qquad(2)$$

in case of FIG. 15C, $$DDXL = \frac{X2 - X1}{Y2 - Y1},\qquad(3)$$

$$DDXR = \frac{X3 - X4}{Y3 - Y4};\qquad(4)$$

and in case of FIG. 15D, $$DDXL = \frac{X3 - X2}{Y3 - Y2},\qquad(5)$$

$$DDXR = \frac{X3 - X4}{Y3 - Y4}.\qquad(6)$$

The parameter processing unit 361 thus obtains the gradients (DDXL, DDXR) of the respective polygons.

Then, the unit 361 transfers, to a scan-line operation unit 362, the thus obtained gradients, the starting-point and ending-point addresses (XLS, XLE) (XRS, XRE), Y starting-point data (YSS), Y ending-point data (YEE) and attributes associated with the polygon edge-pairs of the respective polygons.

A concrete construction example of the parameter processing unit 361 will be described with reference to FIG. 7.

Figure 7:
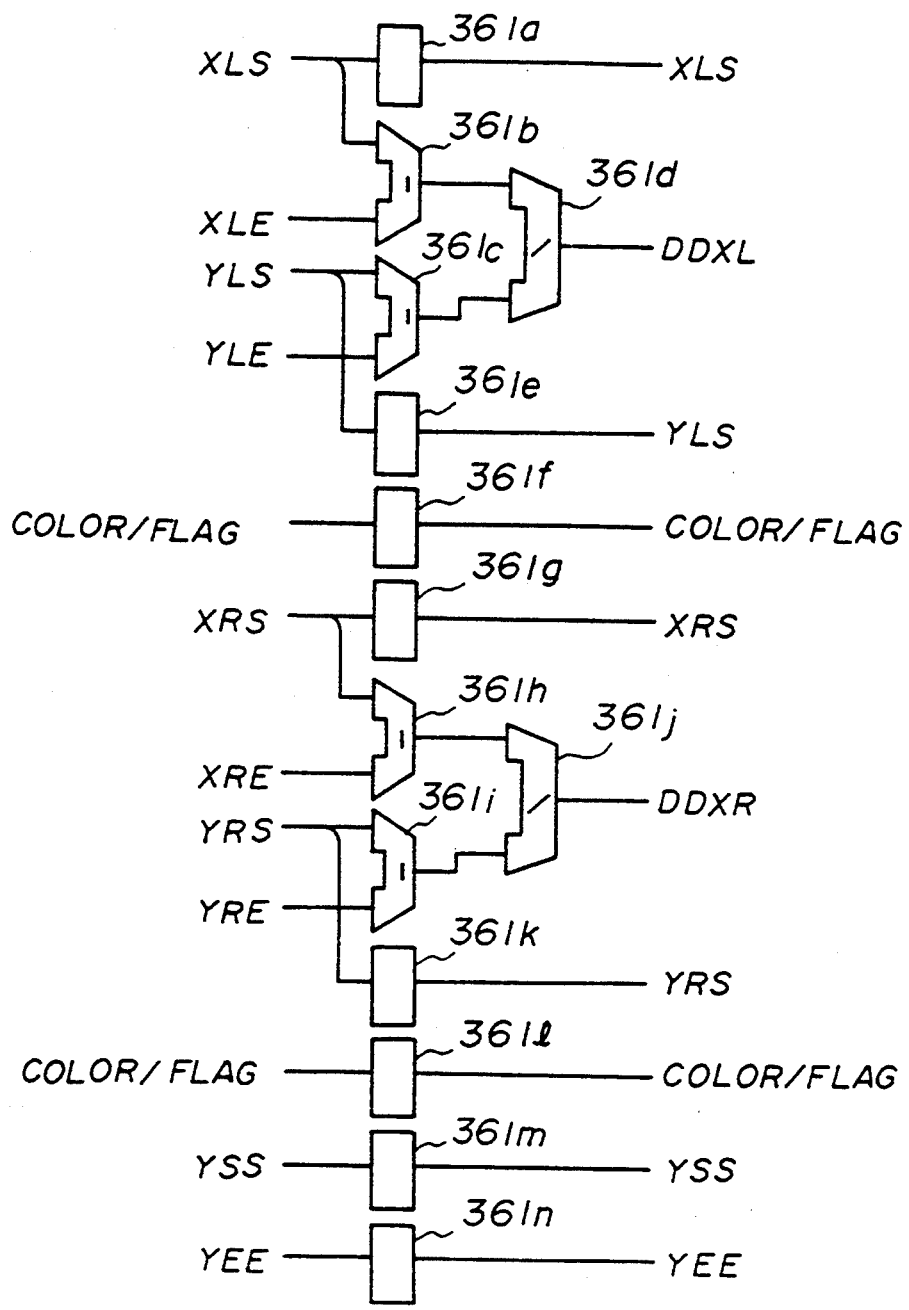
FIG. 7 shows a block diagram illustrating a concrete construction example of a parameter-processing unit used in the embodiment of the present invention.
Figure 8:
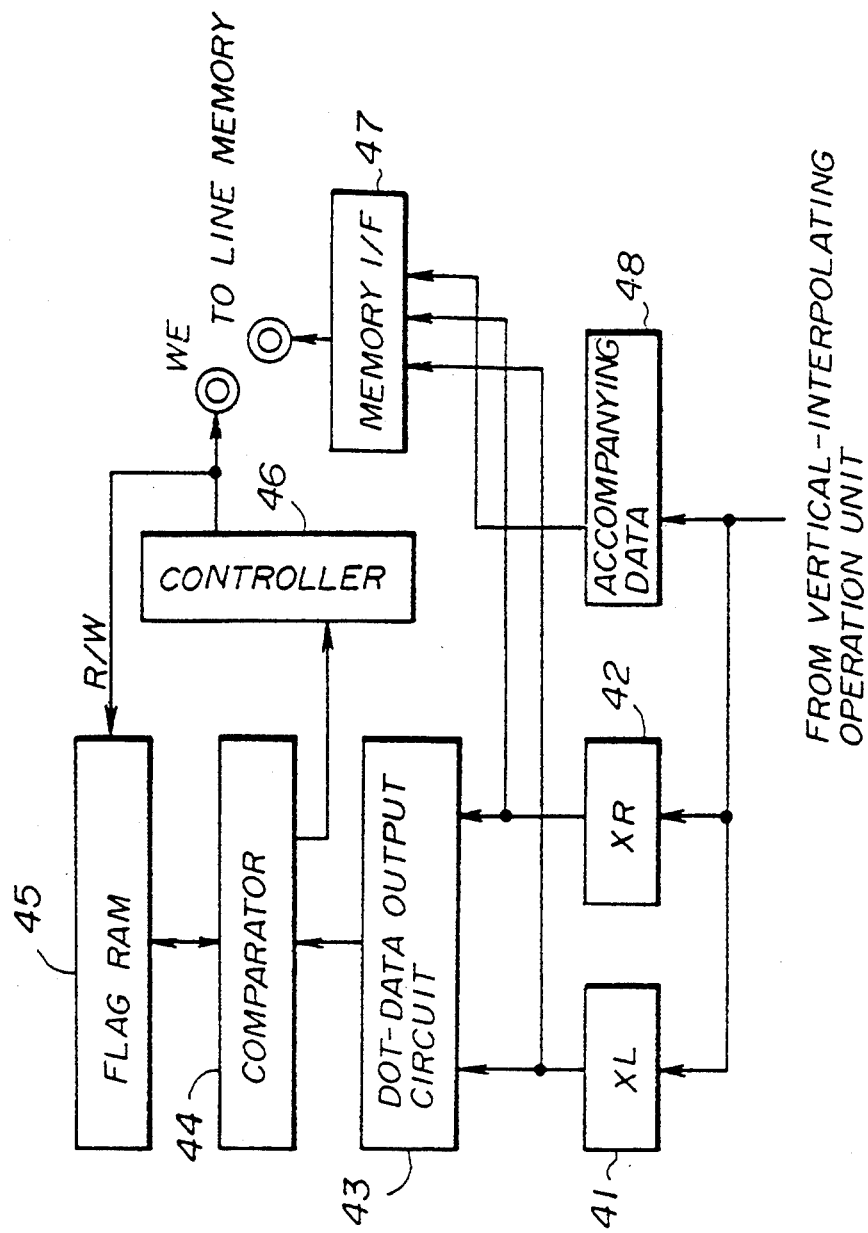
FIG. 8 shows a block diagram illustrating a concrete construction example of a visible/invisible determination processing unit used in the embodiment of the present invention.

As shown in FIG. 7, the starting-point addresses (XLS, XRS) of the polygon edge-pair transferred from the polygon edge-pair extracting unit 31 are stored in registers 361a and 361g, respectively, and also they are applied to one input of subtracters 361b and 361h, respectively. The ending-point addresses (XLE, XRE) of the polygon edge-pair are provided to the other input of the subtracters 361b and 361h, respectively.

Further, the starting-point addresses (YLS, YRS) of the polygon edge-pair transferred from the polygon edge-pair extracting unit 31 are stored in registers 361c and 361k, respectively, and also are provided to one input of subtracters 361c and 361i, respectively. The ending-point addresses (YLE, YRE) of the polygon edge-pair are provided to the other input of the subtracters 361c and 361i, respectively.

The operation results of the subtracters 361b and 361c are input to divider 361d and the divider 361d then inputs the gradient DDXL.

Further, the operation results of the subtracters 361h and 361i are provided to divider 361j and the divider 361j then provides the gradient DDXR.

The Y starting-point data (YSS); Y ending-point data (YEE); and an attribute (such as, in this case, that indicating a color) are provided to registers 361m; 361n; and 361f and 361l, respectively, and then the respective registers provide the respective data to act as parameters to the scan-line operation unit 362 of the vertical-interpolating operation unit 36. The scan-line operation unit 362 calculates necessary data using the following equations for the polygon edge-pairs under the respective conditions as shown in FIGS. 15B, 15C and 15D, for example:

In the case of FIG. 15B, $$XL = (DDXL) \cdot (Y2-Y) + X1 \quad (7),$$

$$XR = (DDXR) \cdot (Y4-Y) + X1 \quad (8);$$

in the case of FIG. 15C, $$XL = (DDXL) \cdot (Y2-Y) + X1 \quad (9),$$

$$XR = (DDXR) \cdot (Y3-Y) + X1 \quad (10) \text{ and}$$

in the case of FIG. 15D, $$XL = (DDXL) \cdot (Y3-Y) + X2 \quad (11),$$

$$XR = (DDXR) \cdot (Y3-Y) + X1 \quad (12).$$

The scan-line operation unit 362 calculates, in accordance with the above equations, the X starting points (XL) and X ending points (XR), from the starting point to the ending point in Y, as shown in FIGS. 18A and 18B. Then, the unit 362 transfers the operation result to the visible/invisible determination processing unit 4 and then only the visible polygon data is transferred to the line memory 50.

A concrete construction example of the scan-line operation unit 362 will be described with reference to FIG. 6.

Figure 6:
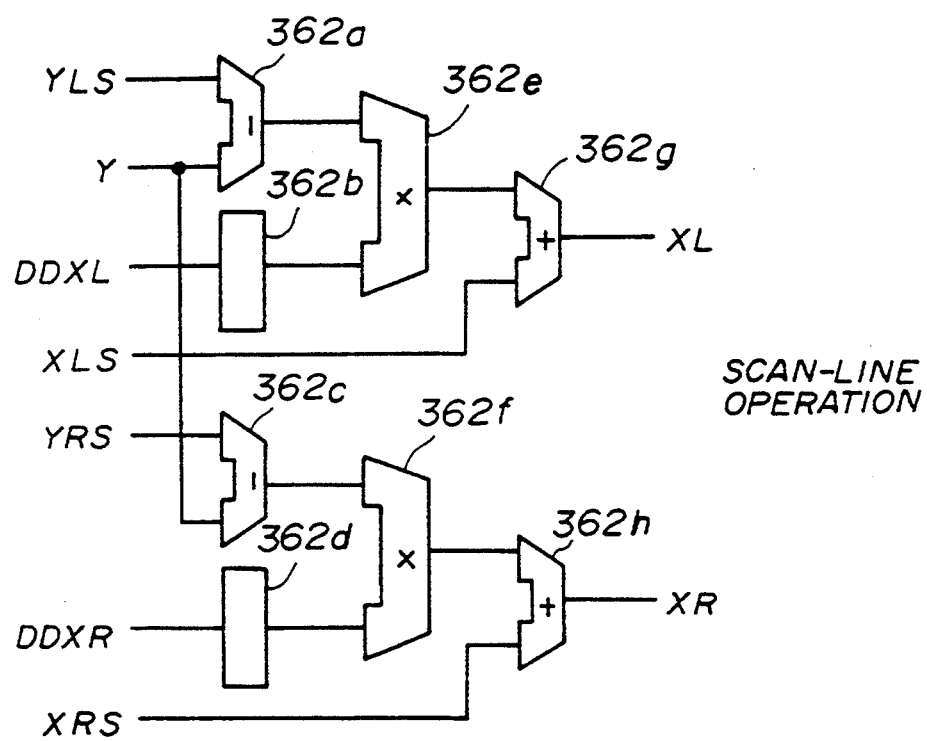
FIG. 6 shows a block diagram illustrating a concrete construction example of a scan-line operation unit used in the,embodiment of the present invention.

As shown in FIG. 6, the transferred gradients (DDXL, DDXR) of the polygon edge-pair are stored in registers 362b and 362d, respectively. The starting-point addresses (YLS, YRS) are provided to one input of subtracters 362a and 362c, respectively. The scan-line address (Y) is provided to the other input of the subtracters 362a and 362c, respectively.

The operation results of the subtracters 362a and 362c are provided to one input of multipliers 362c and 362f, respectively. The DDXL and DDXR values are provided to the other input of the multipliers 362c and 362f, respectively. The operation results of the multipliers 362c and 362f are provided to one input of adders 362g and 362h, respectively. The starting-point addresses (XLS, XRS) of the polygon edge-pair are provided to the other input of the adders 362g and 362h, respectively. The adders 362g and 362h output the X starting point (XL) and X ending point (XR), respectively.

These respective units are controlled by a controller 310. The controller 310 controls the vertical-interpolating operation in accordance with the operation flow charts shown in FIG. 30.

Next, a concrete construction example of the visible/invisible determination processing unit 4 will be described with reference to FIGS. 8, 11A, 11B, 11C, 11D, 11E, 11F, and 11G.

The X value (XL) of the left edge and Y value (XR) of the right edge of the polygon edge-pair provided by the scan-line operation unit 362 are stored in registers 41 and 42. There, the X starting point, that is, the X value (XL) of the left edge is stored in the XL register 41 and X ending point, that is, the X value (XR) of the right edge is stored in the XR register 42.

The XL register 41 and XR register 42 provide the respective X starting-point and X ending-point data of the polygon crossing-point pair (a pair of points at which the relevant polygon edge pair intersect the relevant scan line) to a dot-data output circuit 45. The dot-data output circuit 45 receives the X starting point (XL) and X ending point (XR) from the respective registers 41 and 42. Then, the circuit 45 provides the dot data to a comparator 49, the dot data resulting from converting the received data into data concerning dots (bitmapped pixel information). Such an operation of conversion into dot data may comprise a single-dot conversion or a plural-dot conversion as appropriate. Increase of the resulting number of dots enables reduction of the capacity of a flag RAM 45 in size thereof but degrades the accuracy in the visible/invisible determination operation. In the present invention, a two-dot conversion is used.

The dot data provided by the dot-data output circuit 43 is compared with data in the below-described flag RAM 45 by means of a comparator 44. That is, the comparator 44 compares the dot data provided by the dot-data output circuit 43 with the dot data, stored in the flag RAM 45, concerning the previously displayed polygons. As a result of the comparison, it is determined whether or not the relevant polygon is one which is to be displayed. Then, the comparator 44 provides the result to a controller 46. Then, if the relevant polygon is to be displayed, dot data resulting from logical OR operation being performed on the dot data stored in the flag RAM and the dot data provided by the dot-data output circuit 435, is stored in the flag RAM 45.

This flag RAM 45 stores the dot data resulting from the dot-data conversion being performed on the relevant polygon to be displayed as shown in FIG. 11G.

Figure 9:
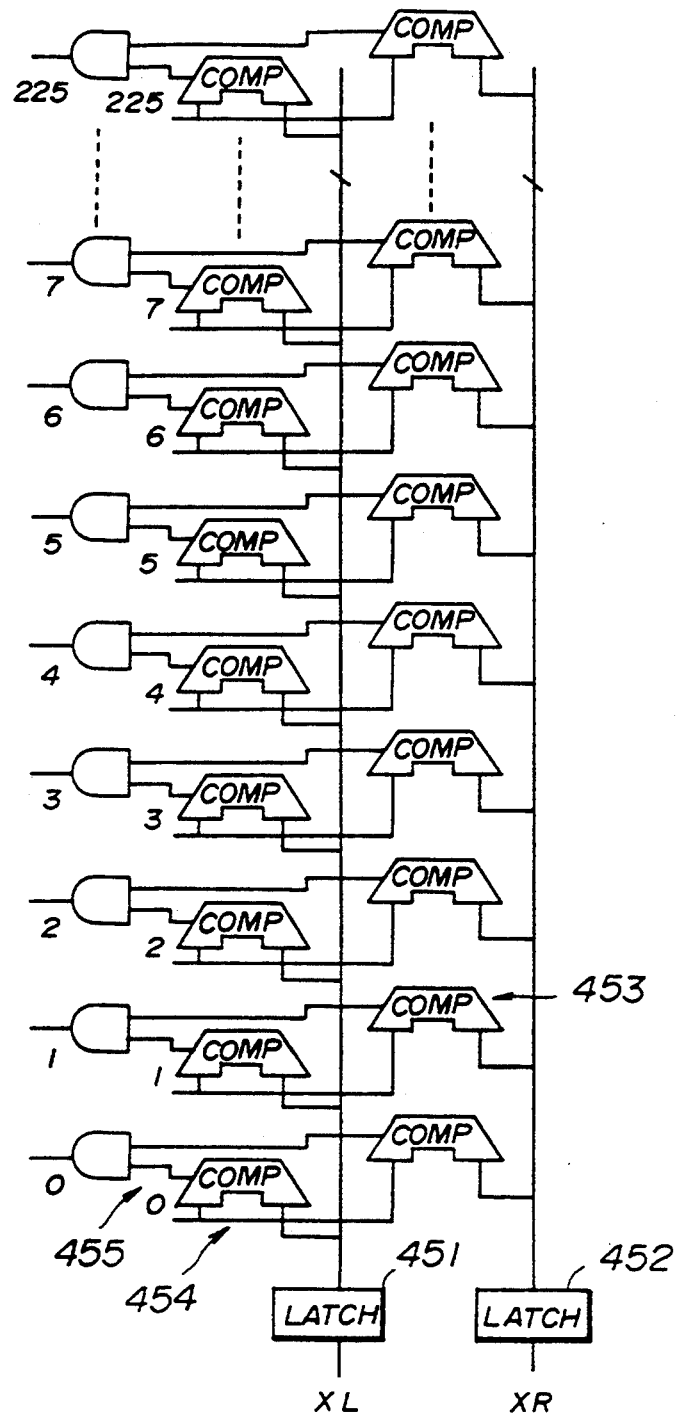
FIG. 9 shows a circuit diagram illustrating a concrete embodiment of a dot-data output circuit in the visible-/invisible determination processing unit of the present invention.

A concrete construction example of the dot-data output circuit 43 will be described with reference to FIG. 9. In the present embodiment, the screen has 512 dots in the X-direction and a two-dot conversion is used. Therefore, each of the groups of comparators 453 and 454 constitutes 256, comparators, numbered 0 to 255.

First, the X starting-point (XL) provided by the XL register 41 is stored in a latch circuit 451 and the X ending-point (XR) provided by the XR register 42 is stored in a latch circuit 452. In the present invention, for the purpose of the two-dot conversion, a rightward shift by one bit is performed on both the X values.

Then, by means of the group 453 of comparators, the X ending-point (XR) is compared with each of the values 0–255. For each of the above values less than XR, the value '1' is transferred to a respective AND device of a group of AND devices 455, as shown in FIG. 11B.

Further, the group 454 of comparators compare the X starting point (XL) with each of the values 0–255. For each of the above values more than XL, the value '1' is transferred to a respective AND device of a group of AND devices 455, as shown in FIG. 11A.

The output of the group 455 of AND devices constitute the dot-data conversion being performed, and is shown in FIG. 11C.

Figure 10:
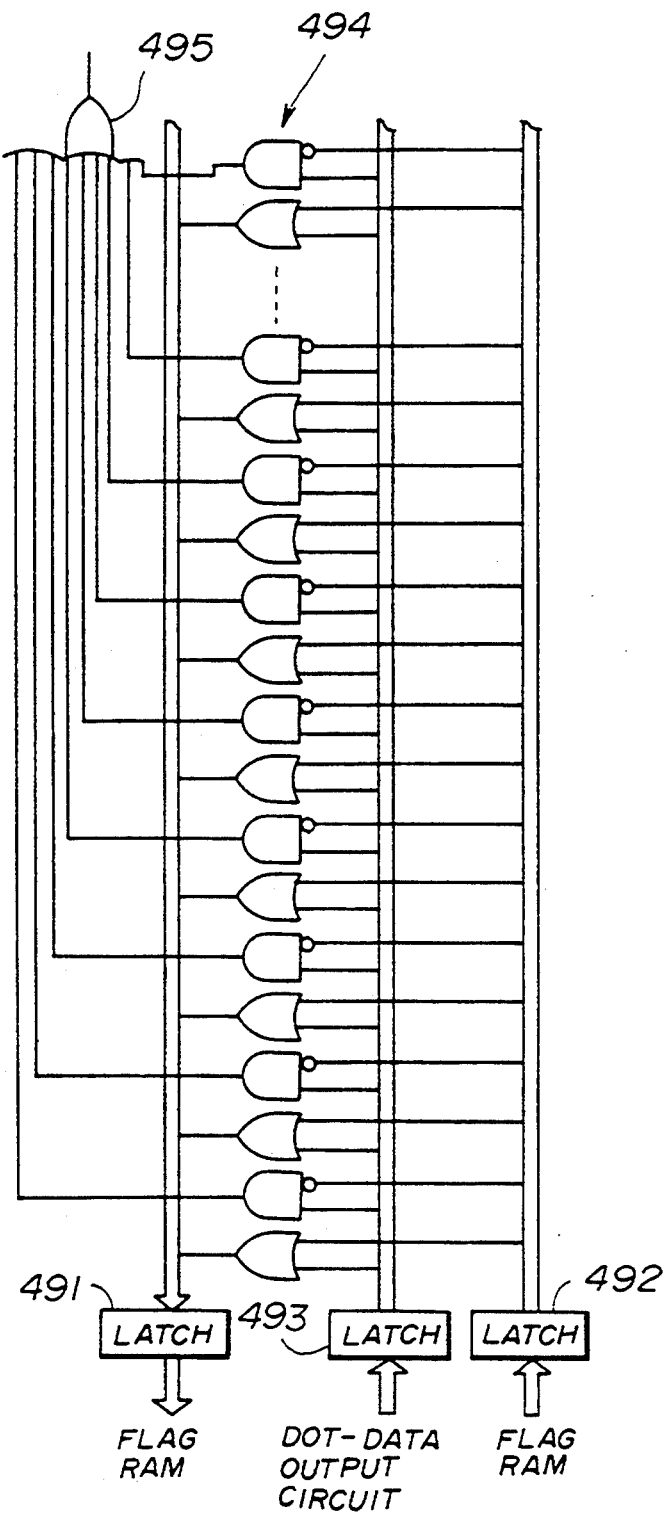
FIG. 10 shows a circuit diagram illustrating a concrete embodiment of a comparator in the visible/invisible determination processing unit of the present invention.

A concrete construction example of the comparator 44 will be described with reference to FIG. 10. This comparator 44 comprises one using the two-dot conversion.

Data provided by the dot-data output circuit 43 is stored in a latch circuit 493 and data provided by the flag RAM 45 is stored in a latch circuit 492.

The data thus stored in the respective latch circuits 492 and 493 is provided to an AND/OR group 494. There, a logical AND operation is performed on the data resulting from inverting the data provided by the flag RAM 45 and the data provided by the dot-data output circuit 43. Further, a logical OR operation is performed on the data provided by the flag RAM 45 and the data provided by the dot-data output circuit 43. Then, the result of the above AND operation, such as that shown in FIG. 11F, is provided to an OR device 495. The OR device 495, since at least one dot of the relevant polygon crossing-point pair is to be displayed if at least one output of the AND outputs of the AND-/OR group 494 is '1', sends a signal requesting the display to a controller 46. If no output of '1' is provided, the device 495 sends a signal requesting non-display to the controller 46. The controller 46 sends a WE (write enable) signal to the line memory 50 so as to store data only for a visible polygon.

Figure 5:
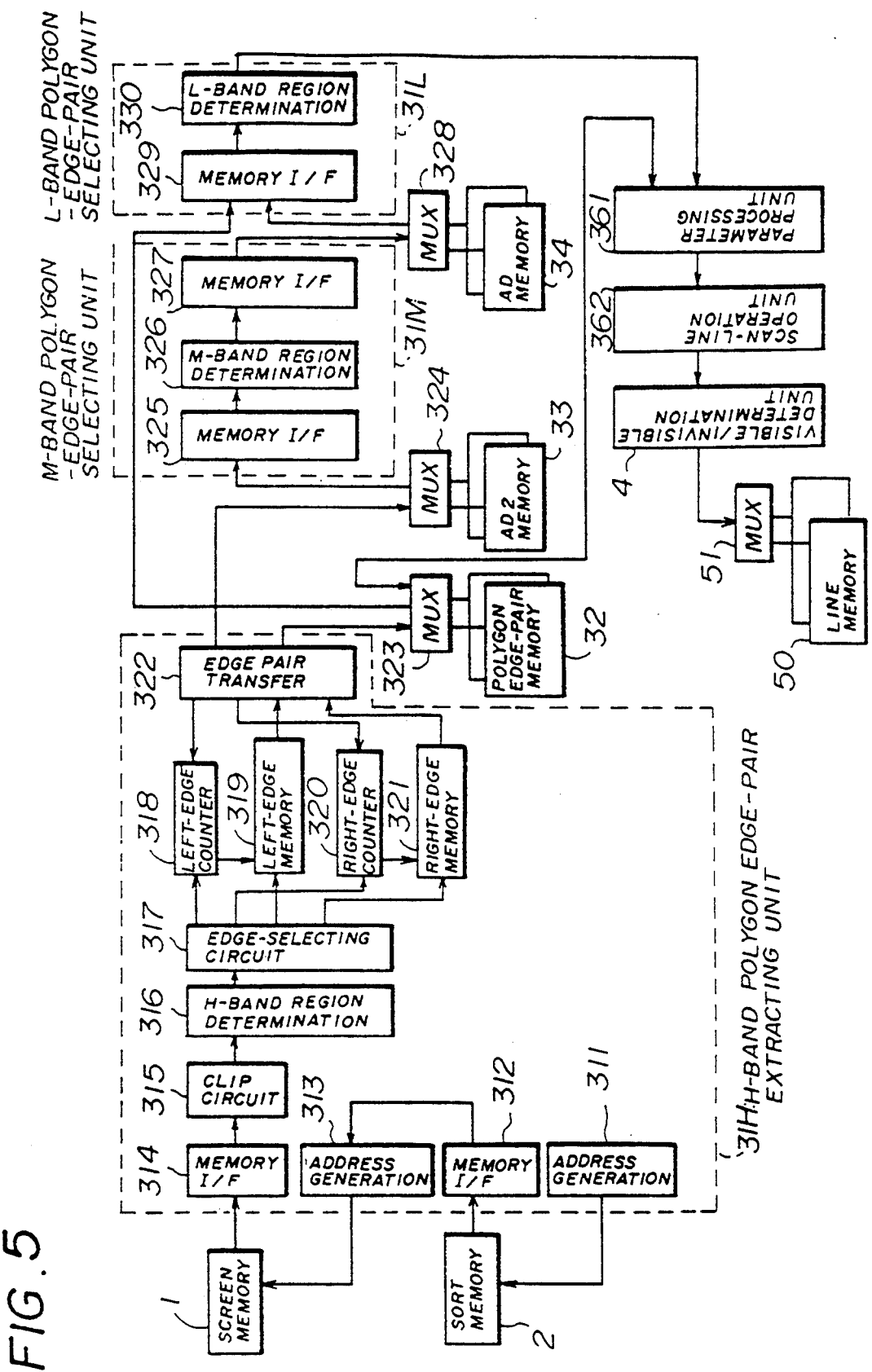
FIG. 5 shows a block diagram illustrating a concrete construction example of an image processing system in an embodiment of the present invention.

A concrete construction example of the image processing system according to the present invention will be described with reference to FIG. 5. Also, the first embodiment of the present invention will be described with reference to FIG. 5.

Data provided from the screen memory 1 is provided to a memory interface (I/F) 314 and then stored therein temporarily.

Accessing of the screen memory 1 is carried out in accordance with addresses generated by an address generation circuit 313. To this address generation circuit 313, data from the sort memory 2 and temporarily stored in a memory interface (I/F) 312 is provided.

Then, based on the data provided from the sort memory 2, the addresses associated with the screen memory 1 are generated.

Further, accessing of the sort memory 2 is carried out in accordance with addresses generated by an address generation circuit 311. Then, the polygon end-point data provided from a memory interface 314 is provided to a clip circuit 315.

The clip circuit 315 compares the polygon end-point data read from the screen memory 1 with the X starting point (SXS) of the screen, the X ending point (SXE) of the screen, the Y starting point (SYS) of the screen, and the Y ending point (SYE) of the screen. As a result of this comparison, the circuit 315 deletes polygons of cases 1–4 shown in FIG. 16, for example. That is, the circuit 315 deletes polygons which lie outside the screen boundary. As a result, only polygons lying inside the screen boundary are processed.

Then, the respective end-point data packets associated with polygons which have not been deleted by means of the clip circuit 315 are provided to an H-band region determination unit 316. The unit 316 provides, to an edge-selecting circuit 317, the respective end-point data packets associated with polygons lying in the relevant H-band regions or overlapping with the relevant H-band region.

This edge-selecting circuit 317 calculates a line vector based on data concerning the starting point (XS) and ending point (XE). Thus, the circuit 317 calculates the direction, from among directions shown in FIGS. 14A and 14B, of the relevant edge. Then, as a result of the above calculation, if the relevant polygon is a clockwise one, then edges having directions 1–4 of FIG. 14A are determined to be left edges and edges having directions 5–8 of FIG. 14A are determined to be right edges. On the other hand, if the relevant polygon is a counter-clockwise one, then edges having directions 1–4 of FIG. 14B are determined to be right edges and edges having directions 5–8 of FIG. 14B are determined to be left edges. Thus, the respective edges of the relevant polygon are grouped.

If an edge is determined to be a left edge, a left-edge counter 318 is incremented and then the relevant edge information is stored in a left-edge memory 319.

If an edge is determined to be a right edge, a right-edge counter 320 is incremented and then the relevant edge information is stored in a right-edge memory 321.

The edge information thus stored in the respective left-edge memory 319 and right-edge memory 321 is used, by means of an edge-pair transfer unit 322, for calculating the edge pairs corresponding to the respective polygons. There, the edges stored in the respective left-edge memory 319 and right-edge memory 321 are sorted in accordance with their Y values (scan-line numbers). Then, from the values in the right-edge counter 320 and left-edge counter 318, as shown in FIGS. 17A, 17B, 17C, 17D, 17E, 17F, 17G, and 17H, the edge pairs corresponding to the respective polygons are calculated. Then, via a multiplexer 323, the resulting data is sent to the polygon edge-pair memory 32 and also, via a multiplexer 324, the same data is sent to the AD memory 33.

A parameter processing unit 361 calculates, from the polygon edge-pair's starting-point and ending-point addresses, parameters which are required for scan-line operation and comprise ones such as gradients of the respective polygons. Then, the thus calculated gradients of the respective polygons and the respective polygons' right-edge and left-edge X starting-point and Y starting-point data and attributes are sent to a scan-line operation unit 362.

The scan-line operation unit 362, for the polygon edge-pairs under various conditions, calculates, in accordance with the above equations (7)–(12), X starting points (XL) and X ending points (XR) through between the starting and ending of Y. Then, the unit 362 sends the result to the visible/invisible determination unit 4 and then only the visible polygon data is transferred to the line memory 50 via a multiplexer 51.

Next, an operation flow of the drawing processing unit 3 of the present embodiment will be described with reference to FIGS. 21–31.

After data is provided to the drawing processing unit 3 from the screen memory 1 and sort memory 2, a sort address counter in the sort-address generating circuit 311 is incremented (a step S1). In accordance with the address thus generated by means of the address generating circuit 311, data indicating a Z value's address (ZAD) is provided to the address generating circuit 313 from the sort memory 2. Then, in accordance with the Z value's address, the polygon's X and Y screen coordinates are read from the screen memory 1, and provided, via the memory interface 314, to the clip circuit 315 (steps S2 and S3).

Subsequently, the clip circuit 315 performs the clipping processing (step S4).

In the step S4, if the polygon lies within the screen boundary, the clipping processing is not performed and a step S5 is carried out. Further, if the polygon does not lie on the screen, a step S85 of FIG. 2B is carried out. In a step S6 through the step S85, the operation of the H-band polygon edge-pair extracting unit is carried out. This example is one in a counterclockwise.

Figure 25:
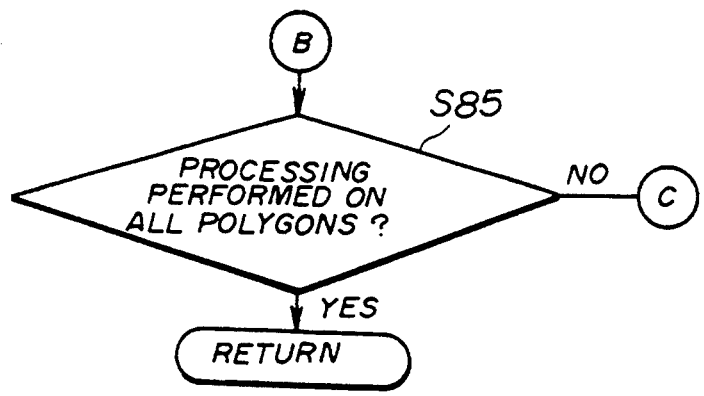

First, in the step S5, the H-band region determination circuit 316 determines whether or not the polygon edge indicated by the polygon edge counter lies inside or overlaps with the relevant H-band region. If it lies inside or overlaps with the relevant H-band region, the step S6 is then executed. If it neither lies in nor overlaps with the relevant H-band region, the step S85 in FIG. 25 is then carried out. In the step S6, the polygon-edge counter of the H-band polygon edge-pair extracting unit 31 is set to '1' and the left-edge counter 318 and right-edge counter 320 are set to '0'.

Subsequently, in a step S7, the H-band region determination circuit 316 determines whether or not the polygon edge indicated by the polygon edge counter lies inside or overlaps with the relevant H-band region. If the polygon edge lies within or overlaps with the relevant H-band region, a step S8 is then carried out. If the polygon edge neither lies within nor overlaps with the relevant H-band region, a step S11 is then carried out.

In the step S8, it is determined whether or not the polygon edge indicated by the polygon edge counter is down-pointing edge. If it is down-pointing one, a step S9 is carried out. If it is not down-pointing one, a step S14 is then carried out. In the step S9, the left-edge counter is incremented by '1' and then a step S10 is carried out. In the step S10 (the term 'step' will be omitted, hereinafter), Y starting-point data (YSS) and Y ending-point data (YEE) is calculated. Then, in the left-edge memory 319 at the address indicated by the left-edge counter 318, the polygon edge's starting point XLS and YSS, and ending point XLE and YEE, and accompanying data are stored. Then, S11 is carried out.

In S11, the polygon edge counter is incremented and then S17 is carried out. In S17, the value of the polygon edge counter and the polygon edge number are compared. Then, if the polygon edge counter value number is smaller than the polygon edge number, S7 is carried out again. Then, the above-described operation is repeated until the polygon edge counter value becomes greater than the polygon edge number. Then, after it becomes greater, S18 is carried out.

On the other hand, if the same polygon edge indicated by the polygon edge counter is not a down-pointing one, S14 is then carried out. In S14, it is determined whether or not the same polygon edge indicated by the polygon edge counter is up-pointing one. If it is an up-pointing one, S15 is then carried out. If the same is not an up-pointing one, S11 is carried out. In S15, the right-edge counter 320 is incremented and then S16 is carried out. In S16, Y starting-point data (YSS) and Y ending-point data (YEE) is calculated. Then, in the right-edge memory 321 at the address indicated by the right-edge counter 320, the polygon edge's starting point XRS, YSS and ending point XRE, YEE and accompanying data are stored. Then, S11 is carried out. The above-described operation is repeated until the polygon edge counter value becomes greater than the polygon edge number.

In S18, the contents stored in the left-edge memory 319 are rearranged so that they are arranged in sequence of polygon starting point Y-coordinate value from the smallest to the largest coordinate value. Then, S19 is carried out and there, the contents stored in the right-edge memory 321 are rearranged so that they are arranged in sequence of polygon starting point value from the smallest to largest coordinate value. Then, S20 is carried out.

In S20, it is determined whether or not both the left-edge counter value and right-edge counter value are respectively '1'. If both are '1', S21 is carried out. In S21, the polygon edge counter is incremented and S22 is then carried out. In S22, the first-address edge pair among those stored in the left-edge memory 319 and the first-address edge pair among those stored in the right-edge memory 321 are stored in the polygon edge-pair memory 32. Then, S23 is carried out. In S23, Y starting-point data (YSS) and Y ending-point data (YEE) is calculated and the result is written into the AD2 memory 33. Then, S85 of FIG. 25 is carried out. In S20–S23, the operation for the case shown in FIG. 17A is carried out.

If at least one of the above-mentioned two counter values is not '1' in S20, S24 is then carried out. In S24, it is determined whether or not the left-edge counter value is '1' and the right-edge counter value is '2'. If the above condition met, S25 is carried out. If not, S31 is carried out. In S25, the polygon edge counter is incremented and then S26 is carried out. In S26, the first-address edge pair among those stored in the left-edge memory 319 and the first-address edge pair among those stored in the right-edge memory 321 are stored in the polygon edge-pair memory 32. Then, S27 is carried out. In S27, Y starting-point data (YSS) and Y ending-point data (YEE) is calculated and then the result is written in the AD2 memory 33. Then, S28 is carried out.

In S28, the polygon edge counter is incremented and then S29 is carried out. In S29, the first-address edge pair among those stored in the left-edge memory 319 and the second edge pair among those stored in the right-edge memory 321 are stored in the polygon edge-pair memory 32. Then, S30 is carried out. In S30, Y starting-point data (YSS) and Y ending-point data (YEE) is calculated and the result is written in the AD2 memory 33. Then, S85 of FIG. 25 is carried out. In S24–S30, the operation for the case shown in FIG. 17B is carried out.

In S31, it is determined whether or not the value of the left-edge counter 318 is '2' and the value of the right-edge counter 320 is '1'. If the above conditions are met, S32 is then carried out. If the value of the left-edge counter 318 is not '2' or the value of the right-edge counter 320 is not '1', S38 is carried out. In S38, the polygon edge counter is incremented and S33 is then carried out. In S33, the first-address edge pair among those stored in the left-edge memory 319 and the first-address edge pair among those stored in the right-edge memory 321 are stored in the polygon edge-pair memory 32. Then, S34 is carried out. In S34, Y starting-point data (YSS) and Y ending-point data (YEE) is calculated and the result is written in the AD2 memory 33. Then, S35 is carried out. In S35, the polygon edge counter is incremented and S36 is then carried out. In S36, the second edge pair among those stored in the left-edge memory 319 and the first-address edge pair among those stored in the right-edge memory 321 are stored in the polygon edge-pair memory 32. Then, S37 is carried out. In S37, Y starting-point data (YSS) and Y ending-point data (YEE) is calculated and the result is written in the AD2 memory 33. Then, S85 of FIG. 25 is carried out. In S31–37, the operation for the case shown in FIG. 17C is carried out.

In S38, it is determined whether or not the value of the left-edge counter 318 is '1' and the value of the right-edge counter 320 is '3'. If the above conditions are met, S39 is carried out. If the value of the left-edge counter 318 is not '1' or the value of the right-edge counter 320 is not '3', S48 is carried out. In S39, the polygon edge counter is incremented and S40 is then carried out. In S40, the first-address edge pair among those stored in the left-edge memory 319 and the first-address edge pair among those stored in the right-edge memory 321 are stored in the polygon edge-pair memory 32. Then, S41 is carried out. In S41, Y starting-point data (YSS) and Y ending-point data (YEE) is calculated and the result is written in the AD2 memory 33. Then, S42 is carried out. In S42, the polygon edge counter is incremented and S43 is then carried out. In S43, the first-address edge pair among those stored in the left-edge memory 319 and the second edge pair among those stored in the right-edge memory 321 are stored in the polygon edge-pair memory 32. Then, S44 is carried out. In S44, Y starting-point data (YSS) and Y ending-point data (YEE) is calculated and the result is written in the AD2 memory 33. Then, S45 is carried out. In S45, the polygon edge counter is incremented and S46 is then carried out. In S46, the first-address edge pair among those stored in the left-edge memory 319 and the third edge pair among those stored in the right-edge memory 321 are stored in the polygon edge-pair memory 32. Then, S47 is carried out. In S47, Y starting-point data (YSS) and Y ending-point data (YEE) is calculated and the result is written in the AD2 memory 33. Then, S85 of FIG. 25 is carried out. In S38–47, the operation for the case shown in FIG. 17D is carried out.

In S48, it is determined whether or not the value of the left-edge counter 318 is '3' and the value of the right-edge counter 320 is '1'. If the above conditions are met, S49 is carried out. If the value of the left-edge counter 318 is not '3' or the value of the right-edge counter 320 is not '1', then S58 is carried out. In S49, the polygon edge counter is incremented and S50 is then carried out. In S50, the first-address edge pair among those stored in the left-edge memory 319 and the first-address edge pair among those stored in the right-edge memory 321 are stored in the polygon edge-pair memory 32. Then, S51 is carried out. In S51, Y starting-point data (YSS) and Y ending-point data (YEE) is calculated and the result is written in the AD2 memory 33. Then, S52 is carried out. In S52, the polygon edge counter is incremented and S53 is then carried out. In S53, the second edge pair among those stored in the left-edge memory 319 and the first-address edge pair among those stored in the right-edge memory 321 are stored in the polygon edge-pair memory 32. Then, S54 is carried out. In S54, Y starting-point data (YSS) and Y ending-point data (YEE) is calculated and the result is written in the AD2 memory 33. Then, S55 is carried out. In S55, the polygon edge counter is incremented and S56 is then carried out. In S56, the third edge pair among those stored in the left-edge memory 319 and the first-address edge pair among those stored in the right-edge memory 321 are stored in the polygon edge-pair memory 32. Then, S57 is carried out. In S47, Y starting-point data (YSS) and Y ending-point data (YEE) is calculated and the result is written in the AD2 memory 33. Then, S85 of FIG. 25 is carried out. In S48–57, the operation for the case shown in FIG. 17E is carried out.

In S58, it is determined whether or not the value of the left-edge counter 318 is '2', the value of the right-edge counter 320 is '2', and also the Y-value of the ending point of the first-address edge pair stored in the left-edge memory 319 is identical to the Y-value of the starting point of the first-address edge pair stored in the right-edge memory 321. Then, if all three conditions above are met, in S59, the polygon edge counter is incremented and S60 is then carried out. In S60, the first-address edge pair edge pair among those stored in the left-edge memory 319 and the first-address edge pair among those stored in the right-edge memory 321 are stored in the polygon edge-pair memory 32. Then, S61 is carried out. In S61, Y starting-point data (YSS) and Y ending-point data (YEE) is calculated and the result is written in the AD2 memory 33. Then, S62 is carried out. In S62, the polygon edge counter is incremented and S63 is then carried out. In S63, the second edge pair among those stored in the left-edge memory 319 and the first-address edge pair among those stored in the right-edge memory 321 are stored in the polygon edge-pair memory 32. Then, S64 is carried out. In S64, Y starting-point data (YSS) and Y ending-point data (YEE) is calculated and the result is written in the AD2 memory 33. Then, S85 of FIG. 25 is carried out. In S58–S64, the operation for the case shown in FIG. 17F is carried out.

If in S58, it is determined that any of the following conditions is not fulfilled, S65 is then carried out: the value of the left-edge counter 318 is '2', the value of the right-edge counter 320 is '2', and the Y-value of the ending point of the first-address edge pair stored in the left-edge memory 319 is identical to the Y-value of the starting point of the first-address edge pair stored in the right-edge memory 321. In S65, it is determined whether or not the value of the left-edge counter 318 is '2', the value of the right-edge counter 320 is '2', and also the Y-value of the starting point of the first-address edge pair stored in the right-edge memory 321 is smaller also the Y-value of the ending point of the first-address edge pair stored in the left-edge memory 319. If the above conditions are met, S66 is then carried out. If not, S75 is then carried out. In S66, the polygon edge counter is incremented and S67 is then carried out. In S67, the first-address edge pair among those stored in the left-edge memory 319 and the first-address edge pair among those stored in the right-edge memory 321 are stored in the polygon edge-pair memory 32. Then, S68 is carried out. In S68, Y starting-point data (YSS) and Y ending-point data (YEE) is calculated and the result is written in the AD2 memory 33. Then, S69 is carried out. In S69, the polygon edge counter is incremented and S70 is then carried out. In S70, the first-address edge pair among those stored in the left-edge memory 319 and the second edge pair among those stored in the right-edge memory 321 are stored in the polygon edge-pair memory 32. Then, S71 is carried out. In S71, Y starting-point data (YSS) and Y ending-point data (YEE) is calculated and the result is written in the AD2 memory 33. Then, in S72, the polygon edge counter is incremented and S73 is then carried out. In S73, the second edge pair among those stored in the left-edge memory 319 and the second edge pair among those stored in the right-edge memory 321 are stored in the polygon edge-pair memory 32. Then, S74 is carried out. In S74, Y starting-point data (YSS) and Y ending-point data (YEE) is calculated and the result is written in the AD2 memory 33. Then, S85 of FIG. 25 is carried out. In S65–S74, the operation for the case shown in FIG. 17G is carried out.

In S75, it is determined whether or not the value of the left-edge counter 318 is '2', the value of the right-edge counter 320 is '2', and also the Y-value of the starting point of the first-address edge pair stored in the right-edge memory 321 is greater than the Y-value of the ending point of the first-address edge pair stored in the left-edge memory 319. If the above conditions are met, S76 is carried out. On the other hand, if all of the above three conditions are not met, S85 of FIG. 25 is carried out. In S76, the polygon edge counter is incremented and S77 is then carried out. In S77, the first-address edge pair among those stored in the left-edge memory 319 and the first-address edge pair among those stored in the right-edge memory 321 are stored in the polygon edge-pair memory 32. Then, S78 is carried out. In S78, Y starting-point data (YSS) and Y ending-point data (YEE) is calculated and the result is written in the AD2 memory 33. Then, S79 is carried out. In S79, the polygon edge counter is incremented and S80 is then carried out. In S80, the second edge pair among those stored in the left-edge memory 319 and the first-address edge pair among those stored in the right-edge memory 321 are stored in the polygon edge-pair memory 32. Then, S81 is carried out. In S54, Y starting-point data (YSS) and Y ending-point data (YEE) is calculated and the result is written in the AD2 memory 33. Then, S82 is carried out. In S82, the polygon edge counter is incremented and S83 is then carried out. In S83, the second edge pair among those stored in the left-edge memory 319 and the second edge pair among those stored in the right-edge memory 321 are stored in the polygon edge-pair memory 32. Then, S84 is carried out. In S84, Y starting-point data (YSS) and Y ending-point data (YEE) is calculated and the result is written in the AD2 memory 33. Then, S85 of FIG. 25 is carried out. In S75–S84, the operation for the case shown in FIG. 17H is carried out.

In S85, it is determined whether or not processing of all polygons has been completed. If it has been completed, the operation of the H-band polygon edge-pair extracting unit 31H is terminated. If it has not been completed, then S38 is again carried out and the above-described operation is repeated until the processing of all polygons has been completed.

Figure 26:
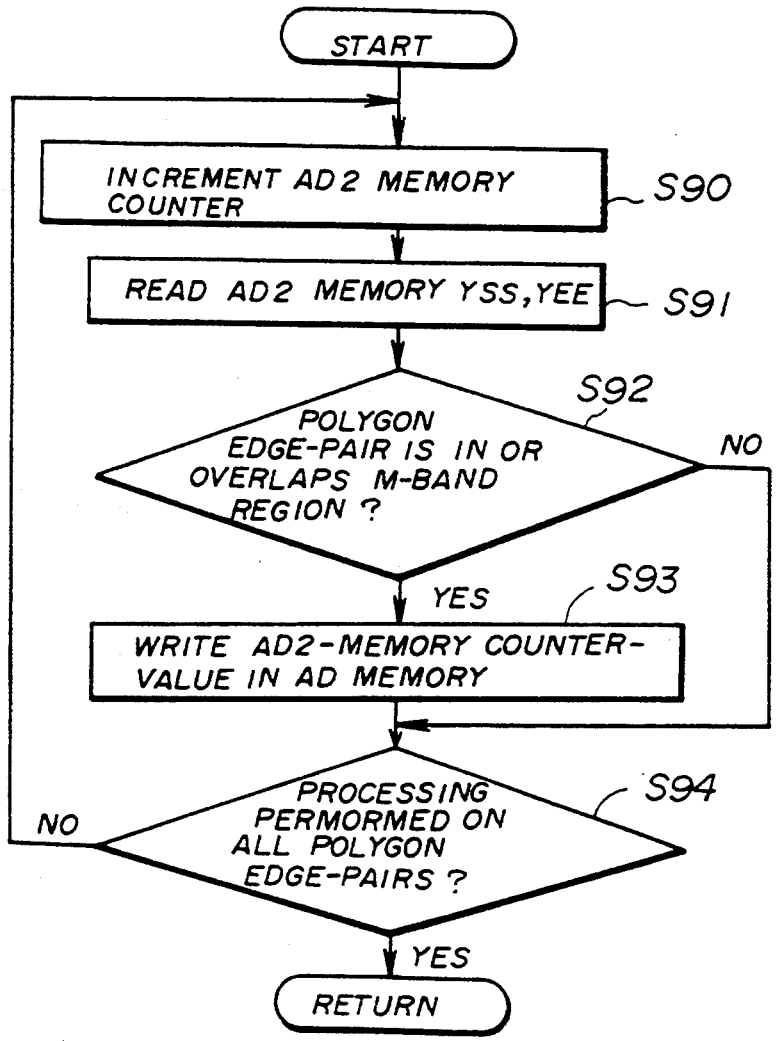
FIG. 26 shows an operation flow chart illustrating an M-band region processing operation in the drawing processing unit in the embodiment of the present invention.

Operation of the M-band polygon edge-pair selecting unit 31M will be described with reference to FIG. 26.

The M-band polygon edge-pair selecting unit 31M, in S90, increments up a memory counter of the AD2 memory 33 and then S91 is carried out. In S91, the unit 31M accesses the AD2 memory 33 and reads the Y starting point (YSS) and Y ending point (YEE) of the relevant edge pair and then carries out S92.

In S92, it is determined whether the relevant polygon edge-pair lies within or overlaps with the relevant M-band region. If so, S93 is carried out. If not, S94 is carried out.

In S93, the AD2-memory memory-counter-value, that is, the address value associated with the AD2 memory 33 is written in the AD memory 34, then S94 is carried out.

In S94, it is determined whether or not processing of all polygon edge-pairs has been completed. If it has not been completed, S90 is again carried out and the above-described operation is repeated until the processing of all polygon edge-pairs has been completed.

If the processing of all polygon edge-pairs has been completed, the operation of the M-band polygon edge-pair selecting unit 31M is terminated.

Figure 27:
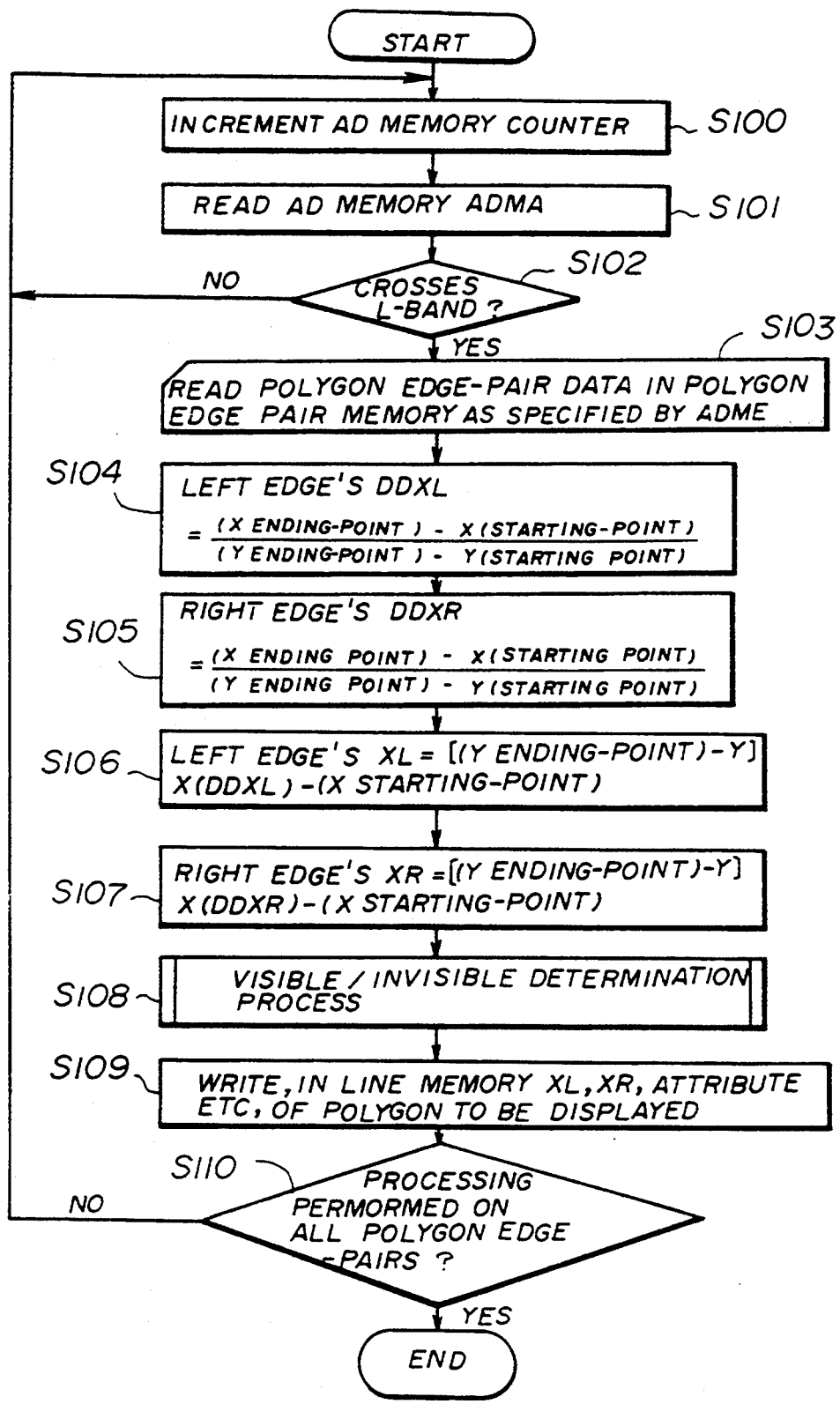
FIG. 27 shows an operation flow chart illustrating a vertical-interpolating processing operation in the embodiment of the present invention.

Operation of the L-band polygon edge-pair selecting unit 31L will be described with reference to FIG. 27.

The L-band polygon edge-pair selecting unit 31L, in S100, increments a memory counter of the AD2 memory 34 and then S101 is carried out. In S101, the unit 31M accesses the AD memory 34 and reads a polygon edge-pair memory address, then carries out S102.

In S102, it is determined whether the relevant polygon edge-pair exists in or overlaps the relevant L-band region. If it lies within or overlaps with the relevant L-band region, then S103 is carried out. If not, S100 is carried out again.

In S103, the unit 31L reads the polygon edge-pair data stored in the polygon edge-pair memory 32 at the position indicated by the polygon edge-pair memory address read from the AD memory 34. Then, S104 is carried out. S100–S103 constitute the operation for the L-band polygon edge-pair selecting unit 31L.

Subsequently, operation of the parameter processing unit 361 is carried out. To start with, the gradient DDXL of the left edge is obtained in S104 and the gradient DDXR of the right edge is obtained in S105. Then, operation of the scan-line operation unit 362 is carried out.

In S106, the left edge is calculated using the following equation:

$$XL = [(Y \text{ ending-point}) - Y] \cdot (DDXL) + (X \text{ starting-point}).$$

Subsequently, in S107, the right edge is calculated using the following equation:

$$XR = [(Y \text{ ending-point}) - Y] \cdot (DDXR) + (X \text{ starting-point}).$$

Subsequently, in S108, XL and XR calculated in S106 and S107 and data such as the polygon attributes are transferred to the visible/invisible determination processing unit 4. They are written in registers 41, 42 and 48 respectively in the unit 4.

Then, in S109, the XL, XR, and attributes of the polygons to be displayed are written in the line memory 50 and then S110 is carried out. In S110, it is determined whether or not the processing of all polygon edge-pairs has been completed. If it has not been completed, S100 is carried out again and the above-described operation is repeated until the processing of all polygon edge-pairs has been completed. If it has been completed, the relevant operation is terminated.

Figure 28:
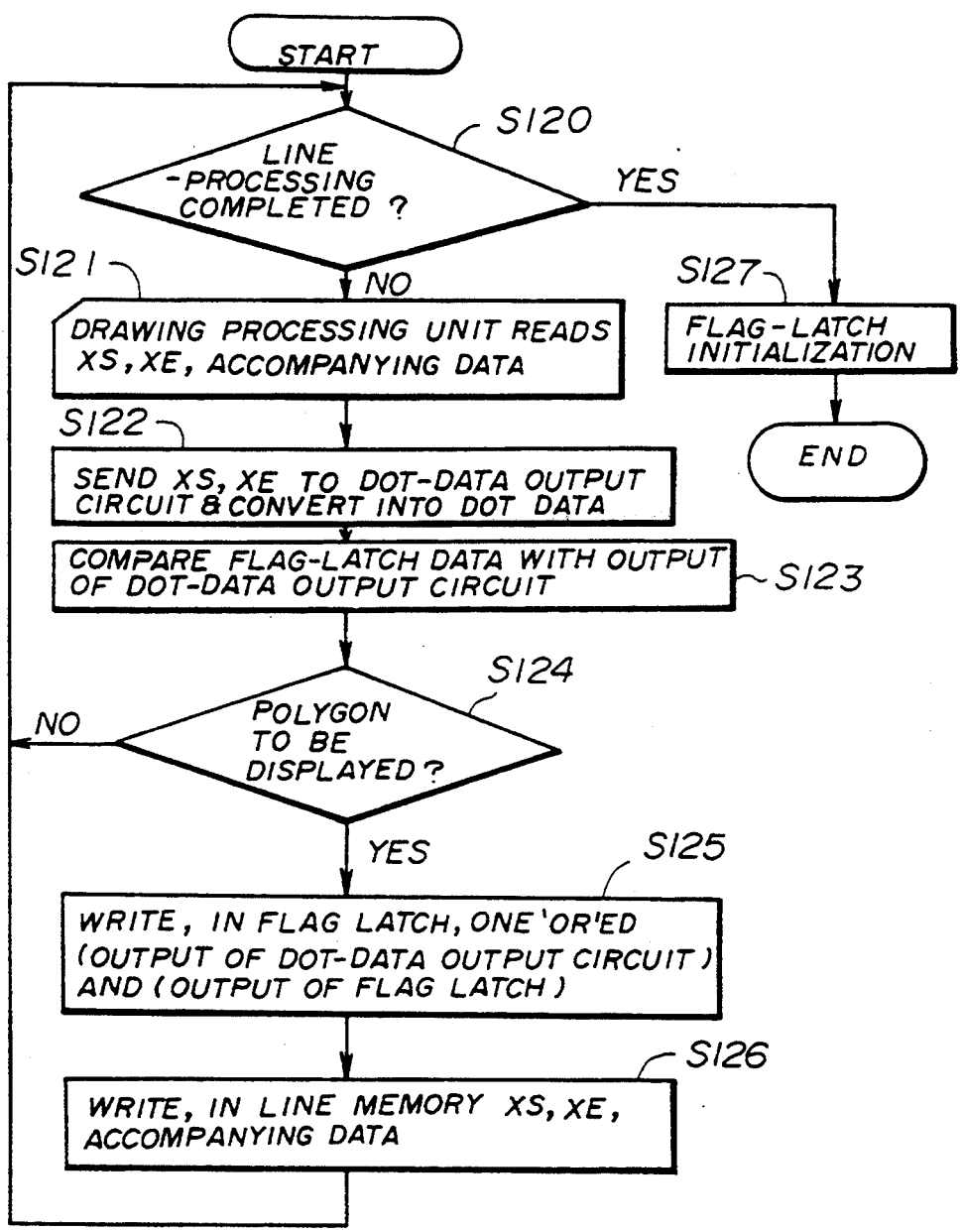
FIG. 28 shows an operation flow chart illustrating a visible/invisible determination processing unit in the embodiment of the present invention.

Next, the operation of the visible/invisible determination processing unit 4 will be described with reference to FIG. 28.

First, in S120, it is determined whether or not the scan-line processing operation has been completed. If not, S121 is carried out. If it has been completed, S127 is carried out.

Immediately after the operation of the visible/invisible determination processing unit 4 begins, the scan-line processing has not been completed. Thus, first S121 is carried out. In S121, XL, XR, and accompanied data are read from the scan-line operation unit 362 of the drawing processing unit 31. Then, S122 is carried out.

Then, in S122, the read XL and XR are sent to the dot-data output circuit 43 and they are converted into dot data there. Then, S123 is carried out.

In S123, the comparator 44 compares the address Y of the flag RAM 45 with the output from the dot-data output circuit 43. Then, S124 is carried out.

In S124, it is determined whether or not the relevant polygon is one to be displayed. If it is one to be displayed, S125 is carried out. If it is not one to be displayed, S120 is carried out again.

In S125, the result of performing a logical OR operation on the output of the flag RAM 45 and the output of the dot-data output circuit 43 is written in the flag RAM 45. Then, S126 is carried out. In S126, a WE signal is sent to the line memory controller and then the XL, XR and accompanied data are written in the line memory 50. Then, S120 is carried out again. The above-described operation is repeated until the scan-line processing operation has been completed. If the operation has been completed, S127 is carried out. Then, the flag RAM 45 is initialized and the operation of the visible-/invisible determination processing operation is terminated.

The above-mentioned operations in the present embodiment are carried out with the timing shown in FIGS. 20A, 20B, 20C, 20D and 20E. There, one line processing cycle represents the time required for processing a single CRT line; one H-band processing cycle corresponds to, as shown in the drawing, a region consisting of 16 adjacent lines arranged in the Y (scan-line shifting) direction. During this 16-line processing cycle, on polygons in the relevant H-band region, the polygon edge-pair extracting processing is performed. On these polygons existing within or overlapping with the relevant H-band region, the above-described operation of the flow charts shown in FIGS. 21–25 is performed Further, one M-band processing cycle in FIG. 20C corresponds to a region consisting of 4 lines arranged in the above Y direction. There, polygons concerning the relevant M-band region are selected during this 4-line processing cycle. That is, the operation of the flow chart shown in FIG. 26 is carried out.

Further, one L-band processing cycle in FIG. 20D corresponds to a region consisting of 1 line. There, polygons overlapping with the relevant line are selected by the operation shown in FIG. 27 during the single line processing cycle. Then, the relevant polygon edge-pair parameters are transferred to the vertical-interpolating operation unit.

Further, one display processing cycle in FIG. 20E is in synchronization with the CRT display process. In each display processing cycle, necessary data such as that concerning the relevant color is interpolated for each polygon which the relevant scan line intersects in each dot clock. Then, the interpolated display data is output.

Further, provision of the visible/invisible determination processing unit enables storing, in the line memory, of the XL, XR and attribute data concerning only polygons to be displayed. As a result, it is possible to effectively display all the polygon parts to be processed, by writing in the line memory data concerning the relevant crossing-point pairs, during one scan-line display time-interval.

Even though the screen is divided so that the resulting regions comprise a three-level hierarchy of regions, H, M and L, the present invention allows any manner of hierarchical division of the screen. Thus, any number is allowed for the number of hierarchical levels as is appropriate.

Further, the present invention is not limited to the above described embodiments, and variations and modifications may be made without departing from the scope of the present invention.

What is claimed is:

1. An image processing system, comprising:
   a) hierarchical division means for dividing a relevant image into a multiple-level hierarchy of regions; and
   b) polygon edge-pair extracting means for extracting polygon edge-pairs to be displayed, wherein:
      1) each edge-pair of said polygon edge-pairs includes a pair of sides among sides which constitute a relevant polygon;
      2) the extraction is performed on regions among the multi-level hierarchy of regions;
      3) the extraction is performed for each level of the multi-level hierarchy; and
      4) the polygon edge-pairs to be extracted include polygon edge-pairs which are included in or overlap with the respective regions.

2. The image processing system of claim 1, wherein:
   a) the multiple-level hierarchy of regions includes:
      1) top-level regions obtained by dividing the relevant image;
      2) at least one level of middle-level regions obtained by dividing each of the top-level regions; and
      3) bottom-level regions obtained by dividing each of the middle-level regions; and
   b) the polygon edge-pair extracting means includes:
      1) top-level extracting means for performing the extracting on respective top-level regions;
      2) middle-level extracting means for, while the top-level extracting means performs the extracting process on one of the top-level regions, performing the extracting on respective middle-level regions constituting the one of the respective top-level regions; and 3) bottom-level extracting means for, while the middle-level extracting means performs the extracting on one of the middle-level regions, performing the extracting process on respective bottom-level regions constituting the one of the middle-level regions.

3. The image processing system of claim 1, wherein the hierarchical dividing means constitutes:

means for geometrically dividing the relevant image into the multiple-level hierarchy of regions.

4. An image processing system comprising:

a) a screen memory for storing X and Y end point information constituting polygons;

b) a sort memory for storing polygon numbers sorted according to a priority value associated with each polygon;

c) a polygon extracting means including:
1) means for dividing a screen image into an n-level hierarchy in a scan-line shifting direction, wherein n is a natural number;
2) means for then accessing the sort memory;
3) means for then reading data from the screen memory, concerning the end points of the polygon corresponding to the value obtained as a result of the sort memory access;
4) means for then, in highest-level regions of the hierarchy, extracting polygon edge-pairs which overlap with the highest-level region, each edge-pair of the polygon edge-pairs including a pair of sides which are among sides constituting a relevant polygon; and
5) means for then, based on polygon-edge information, obtaining the edge pairs to be displayed on a relevant scan line;

d) a polygon-edge-pair memory for storing data concerning a starting point and an ending point in a polygon on the relevant scan line;

e) transfer means for determining whether or not the extracted polygon-edge pair overlaps with the relevant regions, and for then transferring the polygon edge-pair to lower-level regions if the polygon edge-pair overlaps;

f) polygon-edge-pair data transfer means for, in a lowest-level region, determining whether or not the polygon-edge pair overlaps with the lowest-level region, and for then transferring a parameter required for vertical interpolating from the polygon-edge-pair memory, for the polygon-edge-pair, if the polygon edge-pair overlaps;

g) vertical-interpolation operation means for calculating a gradient of the relevant polygon-edge pair based on the relevant data, and for then calculating so as to interpolate between a right crossing point and a left crossing point on the scan line; and h) output means for outputting dot data in synchronization to the scan line associated with display means for displaying the relevant polygon figure.

5. The image processing system of claim 4, wherein the polygon-edge extracting means includes:

means for obtaining a direction of a line vector of each edge constituting the polygon based on the X and Y end point information and polygon-edge information;

means for separating, in accordance with obtained directions of the line vectors, respective edges into two groups including a right edge group and a left edge group;

a left edge counter to be incremented each time one of the separated edges belongs to the left edge group;

a left edge memory for storing edge information concerning the left edges;

a right edge counter to be incremented each time one of the separated edges belongs to the right edge group;

a right edge memory for storing edge information concerning the right edges; and means for sorting the edges stored in the left edge memory and the right edge memory according to scan line, and for then calculating the edge pairs corresponding to the relevant polygon based on values of the left edge counter and right edge counter.

6. The image processing system of claim 4, further comprising:

determination processing means for determining, based on the right crossing point and the left crossing point, whether the relevant polygon constitutes a polygon to be displayed or a polygon not to be displayed; and a line memory for storing the right crossing point and left crossing point on the scan line of only the polygon that is to be displayed.

7. The image processing system of claim 6, wherein the determination processing means includes:

dot-data output means for outputting dot data for each scan line based on the right crossing point and the left crossing point on the scan line, which were calculated by the vertical-interpolating operation means;

a flag memory for storing the dot data associated with the polygons previously determined as ones that are to be displayed;

determination means for comparing the dot data output by the dot-data output means with the dot data stored by the flag memory, and for then determining whether the relevant polygon is a polygon to be displayed or a polygon not to be displayed; and rewriting means for performing a logical OR operation on the dot data associated with the polygons determined by the determination means as ones that are to be displayed and the dot data stored in the flag memory, and for then rewriting the contents of the flag memory with the data resulting from the logical OR operation.

* * * * *